Figure 1:
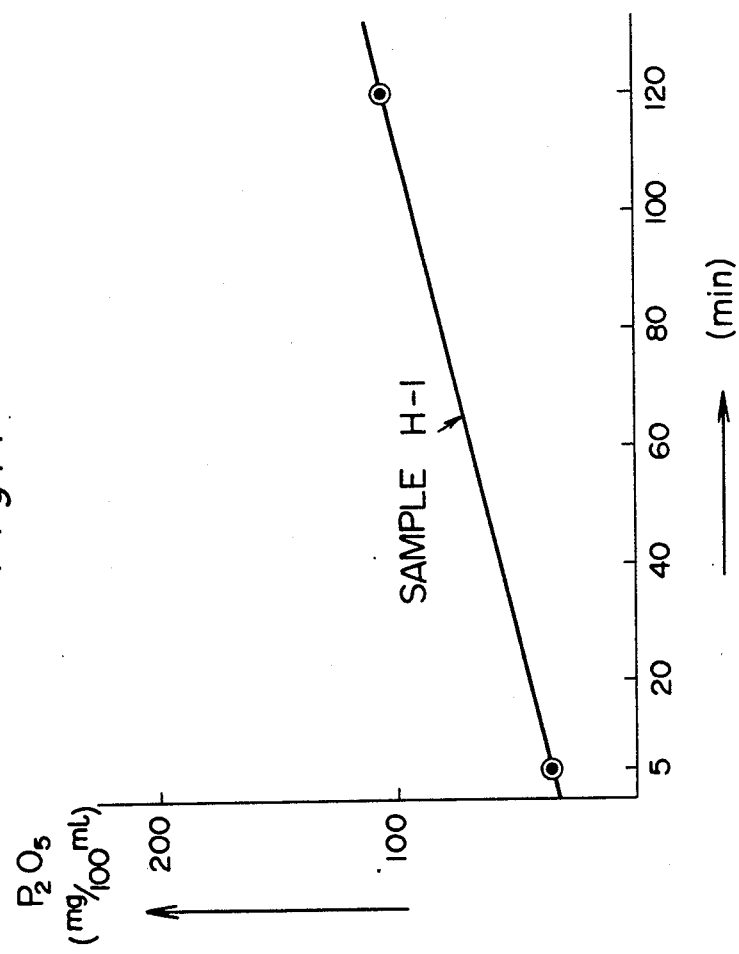

United States Patent [19]

Sugahara et al.

[11] 4,018,616

[45] Apr. 19, 1977

[54] WATER GLASS COMPOSITION

[75] Inventors: Yujiro Sugahara, Tokyo; Yoshibumi Noshi, Tsuruoka; Niroyuki Naito, Tsuruoka; Takashi Maruya, Tsuruoka, all of Japan

[73] Assignee: Mizusawa Kagaku Kogyo Kabushiki Kaisha, Osaka, Japan

[22] Filed: Sept. 11, 1975

[21] Appl. No.: 612,448

[30] Foreign Application Priority Data

Sept. 13, 1974 Japan ............................ 49-104893
Sept. 13, 1974 Japan ............................ 49-104894

[52] U.S. Cl. ........................................ 106/74; 106/84
[51] Int. Cl.² ........................................ C04B 35/16
[58] Field of Search ............................ 106/74, 84

[56] References Cited

UNITED STATES PATENTS

| | | | |
|---|---|---|---|
| 3,178,299 | 4/1965 | Wilborn | 106/74 |
| 3,445,257 | 5/1969 | Hloch et al. | 106/84 |
| 3,669,699 | 6/1972 | Doi et al. | 106/74 |
| 3,930,876 | 1/1976 | Nakajima et al. | 106/74 |
| 3,943,231 | 3/1976 | Wasel-Nielen et al. | 106/84 |

*Primary Examiner*—J. Poer
*Attorney, Agent, or Firm*—Sherman & Shalloway

[57] ABSTRACT

Water glass composition comprising a water-soluble or water-dispersible silicate binder and an inorganic phosphate curing agent, wherein said inorganic phosphate curing agent is composed of an inorganic solid fine powder comprising as the main ingredient a silicon polyphosphate or its metal salt and said curing agent has an initial dissolution amount (B) of up to 200 mg and an average hydrolysis rate constant (A) of at least 0.2, said initial dissolution amount (B) and average hydrolysis rate constant (A) being defined by the following formula:

$$Y = AX + B$$

wherein X stands for the lapse of time (minutes) of up to 120 minutes after 1 g of the curing agent has been added to 100 ml of a 4N sodium hydroxide aqueous solution, and Y stands for the integrated amount (mg/100 ml) of phosphoric acid dissolved out of the curing agent into said aqueous solution during the time X.

22 Claims, 2 Drawing Figures

WATER GLASS COMPOSITION

This invention relates to an improved water glass composition. More particularly, the invention relates to a water glass composition which has good workability and provides molded articles excellent in various properties such as toughness, heat resistance, water resistance and weatherability, and which has a desirable well-balanced combination of good working characteristics and suitable curing characteristics.

Inorganic coating compositions comprising as the main ingredient a water-soluble silicate such as so-called water glass have heretofore been used broadly in various fields. These water-soluble silicates such as water glass are meritorious in that they form aqueous solutions excellent in adhesion and stickiness and these aqueous solutions can easily be applied to substrates to be coated. However, these silicates are defective in that a long time is required for completion of curing of coated films, they are poor in form-retaining property or dimensional stability and such troubles as sagging are readily caused, and that resulting coatings are insufficient in such properties as water resistance, weatherability and toughness.

As means for overcoming these disadvantages, there has heretofore been adopted a method in which an acid or an acidic salt is added as a curing agent to an aqueous solution of a water-soluble silicate such as water glass. Because of a high reactivity with the silicate, however, each of these curing agents causes premature gelation or heterogeneous partial gelation in the silicate as the binder, and therefore, the workability for bonding and coating is drastically degraded and resulting coatings are inferior in such properties as water resistance, toughness and corrosion resistance.

Recently, various proposals have been made to improve the workability of a coating composition comprising a water-soluble or water-dispersible silicate as a binder by incorporating in an aqueous solution of such silicate binder a metal fluoride, a metal silicofluoride, a metal borofluoride, a metal phosphate such as aluminum phosphate or a phosphate including two or more metals (see, for example, Japanese Patent Application Laid-Open Specification No. 12835/73 and Japanese Patent Application Laid-Open Specification No. 30733/72). Compositions of these proposals, however, still retain a tendency of premature gelation of the silicate binder, and practical workability and good storage characteristic or life cannot be expected unless they are used in the state where they are considerably diluted with aqueous media. Moreover, these coating compositions are defective in that curing should be conducted at such a high temperature as 160° C. or higher, and when curing is carried out at room temperature, it is believed that the resulting coatings are drastically inferior in the water resistance and weatherability.

In general, water glass compositions to be used for bonding, painting, lamination, coating and/or molding are required to have the following properties.

In connection with the workability, premature gelation or heterogenous partial gelation should not be caused during a period necessary for performing the coating or painting operation, the impregnation operation or the molding operation, and during this period the viscosity should be maintained to a low level suitable for the above operation. Moreover, after completion of the above operation, curing should be promptly advanced to lower the flowability of the applied composition promptly, and sufficient adhesion and toughness should be guaranteed. Still further, in view of the workability and manufacturing cost, it is desired that gelation of the resulting coating or molded article proceeds promptly at room temperature. Accordingly, it is important that a water glass composition should be of the room temperature curing type.

We made comprehensive research works on activities of pigments of silicon phosphate or the like which are useful as rust-preventive agents (disclosed in Japanese Patent Publication No. 37489/72). As a result, it was found that such silicon phosphate has a peculiar property of releasing water-soluble phosphoric acid very gradually; namely, the silicon phosphate releases very gradually water-soluble phosphoric acid in an aqueous medium, and that this perculiar property is very effective for preventing formation of rusts on metals. Based on this finding, we assumed that the gelation time of a water glass composition comprising a silicate binder and a phosphate curing agent would be closely related to the phosphoric acid-releasing property of the used phosphate curing agent in an alkaline medium, namely the initial solubility and hydrolysis rate of the phosphate curing agent. Based on this assumption, we prepared various silicon phosphates differing in the phosphoric acid-releasing property in an alkaline medium, namely the amount of phosphoric acid initially dissolved and the hydrolysis rate and added them into concentrated aqueous solutions of a silicate binder, and the resulting compositions were tested. As a result, it was found that when a silicon phosphate having a certain specific degree of releasing the soluble component is chosen, substantial gelation is not caused in the resulting composition within 1 to 8 hours necessary for such operation as coating, painting, dipping and molding and after passage of this period curing proceeds very promptly even at room temperature.

It was further found that bonded articles, coated structures or molded articles formed by using a water glass composition including such specific curing agent are excellent in such properties as toughness and adhesion and even when they are cured at room temperature, they have improved water resistance and weatherability sufficient to applications where they are exposed to wind and rain or they are readily contacted with water. Still further, it was suprisingly found that when silicon polyphosphate is used in the form of an alkali metal salt as the inorganic phosphate curing agent having the above-mentioned property of releasing phosphoric acid gradually, the foregoing properties such as water resistance and weatherability can be further improved. Still in addition, it was found that when an inorganic anchoring agent having a specific particle size is used as a filler in combination with a polyvalent metal salt of silicic acid in the above-mentioned water glass composition, the adhesive characteristic of the composition can be highly improved.

It is a primary object of this invention to provide a water glass composition which has a desirable combination of good working characteristics and curing characteristics when it is used for coating, painting, impregnation, bonding, lamination and/or molding.

Another object of this invention is to solve problems involved in conventional water glass compositions, which cannot be solved at all by known phosphate curing agents, by incorporation of a curing agent comprising as the main ingredient a silicon polyphosphate having a property of releasing phosphoric acid gradually in a peculiar manner. More specifically, when a known phosphate curing agent is incorporated into water glass, if the concentration of water glass is high, hydrolysis of the phosphate immediately begins in the concentrated alkaline solution to cause partial gelation or premature gelation of water glass or sedimentation of precipitates and hence, the composition cannot be put into practical use. Therefore, in the conventional technique, the composition is diluted with water to overcome this disadvantage. In contrast, when the curing of this invention comprising as the main ingredient a silicon polyphosphate is employed, since release of phosphoric acid by hydrolysis is conducted very gradually in a concentrated alkaline solution, troubles caused in the case of conventional curing agents, such as partial gelation, precipitation and premature gelation, are not brought about at all and a homogeneous water glass composition having good flowability and good dispersibility can be obtained. In the so formed water glass composition of this invention, curing is not substantially caused during a period of 1 to 8 hours necessary for the above-mentioned operation and hence, the intended operation can be completed effectively and smoothly. Further, since the water glass composition is not diluted with water, after completion of the necessary operation curing proceeds very promptly even at room temperature and it is quite unnecessary to promote curing by heating or baking as in the case of conventional compositions. Thus, according to this invention, there is provided a novel water glass composition capable of affording coated, moled or bonded structures excellent in toughness and adhesion.

Still another object of this invention is to provide a novel water glass composition which is excellent in the above-mentioned combination of the working and curing characteristics and is capable of providing final products such as coated, molded, bonded and laminated articles, which are excellent in such properties as water resistance and weatherability.

In accordance with one fundamental aspect of this invention, there is provided a water glass composition comprising a water-soluble or water-dispersible silicate binder and an inorganic phosphate curing agent, wherein said inorganic phosphate curing agent is composed of an inorganic solid fine powder comprising as the main ingredient a silicon polyphosphate or its metal salt and said curing agent has an initial dissolution amount (B) of up to 200 mg and an average hydrolysis rate constant (A) of at least 0.2, said initial dissolution amount (B) and average hydrolysis rate constant (A) being defined by the following formula:

$$Y = AX + B$$

wherein $X$ stands for the lapse of time (minutes) of up to 120 minutes after 1 g of the curing agent has been added to 100 ml of a 4N sodium hydroxide aqueous solution, and $Y$ stands for the integrated amount (mg/100 ml) of phosphoric acid dissolved out of the curing agent into said aqueous solution during the time $X$.

In accordance with one preferred aspect of this invention, there is provided a water glass composition as set forth above, wherein the inorganic phosphate curing agent is composed of an inorganic solid fine powder comprising as the main ingredient an alkali metal salt of a silicon polyphosphate, the amount of phosphoric acid present in the curing agent is 0.1 to 0.7 mole as calculated as the oxide ($P_2O_5$) per mole of the silicon component as calculated as $SiO_2$ and the amount of the alkali metal component present in the curing agent is up to 20% by weight as calculated as the oxide ($M_2O$ in which M stands for an alkali metal) based on the silicon component ($SiO_2$).

In this invention, in order to obtain a water glass composition having a desirable combination of good workability and good room temperature curing property, it is important that the inorganic phosphate curing agent used should have a property of releasing gradually phosphoric acid in an alkaline medium having a certain pH value. This property of gradually releasing phosphoric acid is determined by adding 1 g of the phosphate curing agent to 100 ml of a 4N sodium hydroxide aqueous solution, agitating the solution at room temperature (25° C.) for a time of up to 120 minutes, plotting on a graph the lapse of time (X, minutes) of up to 120 minutes and the integrated amount (Y, mg/100 ml) of phosphoric acid ($P_2O_5$) dissolved out of the curing agent into the solution during the time X, and obtaining the value of the initial dissolution amount (B) from the intercept on the axis Y of the graph (or the extrapolation value to the axis Y) and the average hydrolysis rate constant (A) from the average gradient of the straight line or curve on the graph.

Figure 2:
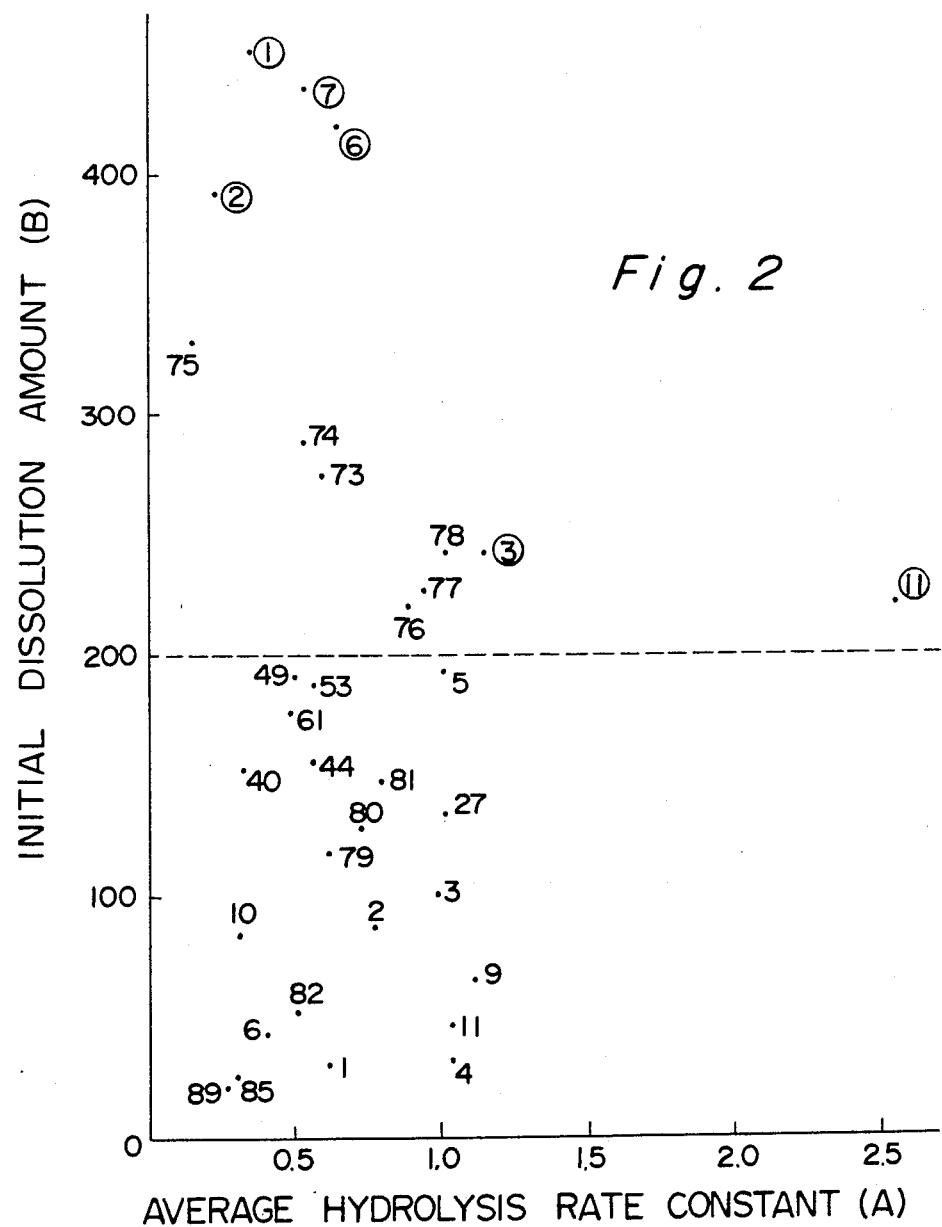

In the accompanying drawings,

FIG. 1 is a curve of the integrated amount of phosphoric acid dissolved (as $P_2O_5$) in an instance of the phosphate curing agent satisfying the requirements of this invention, and FIG. 2 is a diagram on which initial dissolution amounts (B) and average hydrolysis rate constants (A) of curing agents used in Examples given hereinafter are plotted.

In this invention, in order to prevent premature gelation or heterogeneous gelation of the water-soluble silicate binder, maintain the viscosity of the water glass composition to a relatively low level suitable for handling for a time necessary to perform such operations as coating, painting, molding, dipping and bonding and to obtain a cured water glass layer excellent in mechanical properties and durability, it is important that the initial dissolution amount (B) should be up to 200 mg, especially up to 100 mg. For example, as illustrated in FIG. 2 and Table 7 given hereinafter, phosphate type curing agents having an initial dissolution amount (B) larger than 200 mg, such as aluminum phosphate, magnesium phosphate and zinc phosphate, cause partial gelation even at room temperature simultaneously with addition if they are used in an amount of 40 parts per 100 parts of the silicate binder ($SiO_2$), and within such a relatively short time as 30 minutes, the entire compositions are cured and it is difficult to maintain the viscosity at a low level suitable for the above-mentioned operations for a sufficient time. Further, coatings, films, molded articles or bonded structures prepared from these compositions are generally inferior in peel strength, tensile strength or compression breakage strength and such properties as water resistance and weatherability.

In this invention, in order to obtain a water glass composition capable of providing, after the above-mentioned application operation and curing, a cured product excellent in mechanical properties, adhesion or stickiness, water resistance, weatherability and durability, it is important that the average hydrolysis rate constant (A) should be at least 0.2, especially within a range of from 0.3 to 1.2.

When a phosphate having an average hydrolysis rate constant (A) lower than 0.2, for example, calcium phosphate or phosphate rock, is employed, it is difficult to obtain cured products which are satisfactory in mechanical properties and water resistance. When the average hydrolysis rate constant (A) of the silicon polyphosphate is higher than 1.2, various disadvantages are readily brought about. For example, the viscosity of the alkali silicate binder is elevated to such a high level as will damage the above application operations within a time necessary for the operation, or heterogeneous gelation of the alkali silicate binder is caused, resulting in degradation of the mechanical properties and water resistance in the cured water glass composition.

The curing agent of this invention comprising as the main ingredient a silicon polyphosphate or its metal salt is used in the form of a powder of a silicon polyphosphate or its metal salt or in the form of a powder of a composition comprising this main ingredient and containing condensed phosphoric acid and anhydrous silicic acid components as a specific ratio. More specifically, in accordance with one preferred embodiment of this invention, there is employed as the curing agent a pigment powder containing a silicon polyphosphate or its metal salt and having an oxide composition represented by the following formula:

$$SiO_2 \cdot xMO_{n/2} \cdot 0.1-0.7 P_2O_5$$

wherein M stands for an alkali metal, an alkaline earth metal, aluminum or zinc, $n$ designates the valency of the metal M, and $x$ stands for a positive number smaller than 0.2 (inclusive of zero).

As such pigment, there can be mentioned silicon phosphates such as $2SiO_2 \cdot P_2O_5$, $3SiO_2 \cdot 2P_2O_5$ and $SiO_2 \cdot P_2O_5$, mixtures of these phosphates, metal salts of these phosphates, and mixtures and complexes of these phosphates or their metal salts with anhydrous silicic acid, silicates and/or other phosphates.

In curing agents of the above type, if the mole ratio of the phosphoric acid component expressed as $P_2O_5$ to the silicic acid component expressed as $SiO_2$ is lower than 0.1, it is difficult for the curing agents to release gradually phosphoric acid at the above-mentioned average hydrolysis rate constant (A), and if the mole ratio of $P_2O_5$ to $SiO_2$ is higher than 0.7, the initial dissolution amount (B) of phosphoric acid is larger than the range specified in this invention. In each case, the intended objects of this invention cannot be attained. Even when these silicon polyphosphates contain alkali metals such as sodium and potassium, alkaline earth metals such as calcium and magnesium, aluminum and zinc in the form of a phosphate or silicate or a double salt thereof, no particular disadvantages are brought about as far as the foregoing requirements of the property of gradually releasing phosphoric acid are satisfied.

These pigments to be used as curing agents in this invention may be prepared by intimately mixing amorphous silica, crystalline silica such as siliceous sand, a silica or a mineral substance composed mainly of such siliciferous material with an oxyacid of phosphorus, an anhydride of an oxyacid of phosphorus or a salt of an oxyacid of phosphorus in the presence of water, drying the mixture according to need, then calcining the mixture and pulverizing the calcined product. In this case, the kinds of the starting materials, the mixing conditions, the calcination conditions and the pulverization conditions are appropriately chosen so that the foregoing requirements of the initial dissolution amount and average hydrolysis rate constant are satisfied. Any of amorphous silica, crystalline silica and amorphous silicates can be used as the starting material of the silicic acid component, and from the industrial viewpoint, use of mineral substances composed mainly of the foregoing siliciferous materials is preferred.

As the amorphous silica, there can be employed a hydrosol of silica, a hydrogel of silica, a xerogel of silica and an amorphous calcination product of silica. In the instant specification, by the term "amorphous silica" is meant silica which is determined as being "amorphous" by X-ray diffractiometry. Powders of quartz and siliceous sand are preferably employed as the crystalline silica.

Alkali metal, alkaline earth metal and aluminum salts of silicic acid may be used for the preparation of the curing pigments. These salts may be used in the form of an aqueous solution, a sol, a gel, a powder or a crystal.

Among the foregoing silicates, sodium silicate, potassium silicate, magnesium silicate, calcium silicate, barium silicate and aluminum silicate are preferably employed. These silicates may be so-called polysilicates.

In addition, mixtures of two or more of the foregoing silicic acid derivatives and naturally occurring colorless clay minerals composed mainly of amorphous or crystalline silica and/or silicates can be used. For example, mixtures containing silicic acid and aluminum silicate at various mixing ratios are preferably used as the starting material of the silicic acid component of the curing pigment to be used in this invention. The starting material of the silicic acid component may include impurities as far as the whiteness is not drastically degraded. For instance, substances containing small amounts of metals, e.g., Al, Mg and Ca, such as acid-treated acid clay obtained by acid treatment of acid clay and whitened diatomaceous earth obtained by treating naturally occurring diatomaceous earth, can be used. Still in addition, colorless clay minerals such as natural zeolite, diatomaceous earth and high quality kaoline and preferably be employed. The "clay mineral" referred to in the instant specification includes phillosilicate biostrome bonded substances (clay minerals), tectosilicate three-dimensional bonded substances and naturally occurring amorphous silicates. Accordingly, any of silicic acids and silicates formed as by-products, intermediate products and final products in inorganic chemical industries and ceramic industries can be used as the starting material of the silicic acid component of the curing pigment to be used in this invention.

As the starting material of the oxyacid component, there can be employed, for example, orthophosphoric acid ($H_3PO_4$), metaphosphoric acid ($HPO_3$), pyrophosphoric acid ($H_4P_2O_7$), hexametaphosphoric acid [$(HPO_3)_6$], tripolyphosphoric acid ($H_5P_3O_{10}$), phosphorus acid ($H_3PO_3$) and hypophosphorous acid ($H_3PO_2$). Of course, an anhydrous acid such as phosphorus pentoxide ($P_2O_3$) can also be used as the starting material of the phosphorus oxyacid component. As the colorless phosphorus oxyacid salt, there can be mentioned, for example, alkali metal, ammonium, alkaline earth metal, zinc, lead and aluminum salts of oxyacids of phosphorus.

In the preparation of the curing pigment, the above-mentioned silicic acid component starting material and phosphorus oxyacid component starting material are intimately mixed with each other. In order to obtain a silicon phosphate pigment having the above-mentioned property of gradually releasing phosphoric acid, it is important that this mixing operation should be conducted in the presence of water. For example, an intimate admixture can be formed by using a sol or hydrous gel of the silicic acid component starting material and adding thereto an aqueous solution or slurry of the phosphorus oxyacid component, or by adding an aqueous solution or dispersion of the phosphorus oxyacid component to a dried gel or powder of the silicic acid component starting material. When a salt of a phosphorus oxyacid is employed, it is possible to mix both the starting materials by dry pulverization, but more intimate mixing can be attained by using water or other aqueous medium.

In order for the phosphate curing agent of this invention composed mainly of a silicon polyphosphate or its alkali salt to have the above-mentioned property of gradually releasing phosphoric acid, it is important that in the powder of this curing agent, the phosphoric acid component and the silicic acid component should be tightly and homogeneously bonded to each other and the contained phosphoric acid component should be homogeneously and appropriately condensed. More specifically, in the case of a curing agent powder in which bonding of both the components or condensation of the phosphoric acid component is heterogeneous, there is often observed an undesired tendency that the soluble phosphoric acid component is released in a large quantity at the initial stage, and hence, the desirable combination of good workability and room temperature curing property intended in this invention cannot be expected and a final product excellent in water resistance can hardly be obtained. For example, a powdery curing agent obtained by dry-blending an aluminum phosphate powder and a solid powder of calcium silicate and calcining the mixture at a temperature of about 500° C. has an initial dissolution amount (B) much larger than 200 mg, and when this powdery curing agent is added to a commercially available sodium silicate solution, partial gelation of the solution is readily caused and the solution is completely gelled in a very short time, e.g., within 1 hour (see Comparative Sample C-11 mentioned hereinafter). In contrast, a powdery curing agent prepared according to this invention by homogeneously mixing the silicic acid component and the phosphoric acid component in an aqueous medium and calcining the resulting mixture has a desirable property of gradually releasing soluble phosphoric acid in an alkaline medium, and it provides a desirable combination of good workability and room temperature curing property.

In general, the amount of water necessary for mixing the silicic acid component and the phosphoric acid component is 1 to 180% by weight, preferably 3 to 100% by weight, based on the resulting powdery curing agent composed of a silicon phosphate or the like. This water may be added in the state contained in phosphoric acid or the silicic acid component starting material as pointed out hereinbefore, or independently from both the starting materials.

In order to attain homogeneous mixing and reaction of the silicic acid and phosphoric acid components, it is preferred that starting materials having a higher reactivity be employed. For example, an as-prepared silicic acid gel or an acid-treated clay is preferably employed as the silicic acid component starting material, and phosphoric acid of an industrial grade having a concentration of 85% is preferably employed as the phosphoric acid component starting material.

The mixing ratio of the silicic acid component starting material and the phosphorus oxyacid component starting material is greatly changed depending on the kinds of the starting materials used, and the mixing ratio is so selected that the final composition is included in the above-mentioned range and the desired property of gradually releasing phosphoric acid can be obtained.

The so prepared intimate and homogeneous mixture of the silicic acid component starting material and phosphoric acid component starting material is calcined. The calcination temperature is greatly changed depending on the kinds of the starting materials used, but in general, the calcination temperature is selected within a range of 200° to 1000° C., especially 400° to 1000° C., so that the above-mentioned requirements of the initial dissolution amount (B) and average hydrolysis rate constant (A) are satisfied. The intimate mixture of the starting materials is calcined at the so selected temperature.

The silicon phosphate or its metal salt prepared by the above calcination is pulverized so that the above requirements of the initial dissolution amount (B) and average hydrolysis rate constant (A) are satisfied. Any of dry pulverization methods and wet pulverization methods using water or organic solvents can be adopted for this pulverization. In case the calcination product is wet-pulverized in water and the pulverized product is merely dried, the resulting powder contains a soluble component being dissolved in an alkaline medium at an initial stage and this curing agent powder tends to cause initial gelation of the resulting water glass composition. Accordingly, in this case, it is preferred that the phosphoric acid component dissolved out in water be removed or a solvent capable of preventing the phosphoric acid component from being dissolved out be used.

The most important problem encountered when a silicate binder such as an alkali silicate, namely water glass, is used for the production of coatings, bonded structures or molded structures, resides in that although cured water glass has excellent strength, adhesion or stickiness in the dry state, such properties are drastically degraded in the state dipped in or wetted with water. In the curing agent of this invention composed mainly of a silicon polyphosphate, the initial dissolution amount (B) and average hydrolysis rate constant (A) are adjusted within the above-mentioned ranges, whereby the above poor water resistance of the water glass composition can be highly improved.

In order to further improve the water resistance of a water glass composition of this invention comprising the above-mentioned silicate binder and phosphate curing agent, it is preferred to use an alkali metal salt of a silicon polyphosphate in which the mole ratio of the phosphoric acid component as the oxide ($P_2O_5$) to the silicic acid component as the oxide ($SiO_2$) is 0.1 to 0.7, especially 0.2 to 0.5, and the content of the alkali metal component as the oxide ($M_2O$ in which M is an alkali metal) is up to 20 % by weight, especially 2 to 10 % by weight.

This alkali metal salt of a silicon polyphosphate is prepared by passing a commercially available aqueous solution of an alkali silicate or its dilution with water, for example, an aqueous solution containing an alkali silicate at a concentration, as calculated as $SiO_2$, 1 to 10 %, especially 4 to 8 %, through a cation exchange resin of the hydrogen type, to thereby deionize the alkali metal component so that the alkali metal component content in the final curing agent is within the above-mentioned range of 2 to 20 % by weight, reacting the resulting activated silicic acid solution containing the alkali metal component in a limited amount or its concentration with phosphoric acid so that the mole ratio of the phosphoric acid component to the silicic acid component in the final curing agent is within the range of from 0.1 to 0.7, drying the resulting slurry of the alkali metal salt of the silicon polyphosphate, calcining the resulting powder at the above-mentioned temperature and, if desired, pulverizing the calcination product. When such activated silicic acid solution containing a limited amount of an alkali metal component is reacted with phosphoric acid in the above-mentioned manner, there can be obtained a phosphate curing agent having both the initial dissolution amount (B) and average hydrolysis rate constant (A) within the ranges specified in this invention, which can impart a highly improved water resistance to the final water glass composition. This is a very surprising fact. The alkali metal component is highly water-soluble and has a property of solubilizing an acid component such as silicic acid and phosphoric acid in the form of a salt. Accordingly, if a silicon polyphosphate is converted to a salt of an alkali metal, it is expected that both the initial dissolution amount (B) and average hydrolysis rate constant (A) will be greatly increased in the resulting alkali metal salt and the water resistance will be rather reduced in the final water glass composition. However, it has been found to our great surprise that as is illustrated in Referential Example 1 given hereinafter, no substantial increase is observed in either the initial dissolution amount (B) or the average hydrolysis rate constant (A) in the resulting silicon phosphate alkali metal salt and the water resistance can be highly improved in the final water glass composition.

In preparing a curing agent of the above-mentioned silicon phosphate alkali metal salt type to be preferably used in this invention, in order to react and bond the three components homogeneously and uniformly, it is preferred to react an activated silicic acid solution containing a limited amount of an alkali metal with phosphoric acid in the foregoing manner. However, this silicon polyphosphate alakli metal salt may also be prepared by making an alkali metal component present in the form of an oxide, hydroxide, carbonate, phosphate or silicate in an amount within the above-mentioned range in preparing a silicon polyphosphate in the above-mentioned manner or preparing a silicon polyphosphate in advance in the above-mentioned manner and mixing an alkali metal component in the above-mentioned form with the silicon polyphosphate, and calcining the mixture at a temperature within the above-mentioned range and, if desired, pulverizing the calcination product.

In preparing a silicon polyphosphate or its metal salt, especially its alkali metal salt, having the initial dissolution amount (B) and average hydrolysis rate constant (A) specified in this invention, it is preferred to adopt a multi-staged calcination method. The silicon polyphosphate or its metal salt obtained from the above-mentioned calcination step has a controlled initial dissolution amount (B) as it is in the as-prepared state. However, if it is pulverized according to the dry method, there is often observed a tendency that the initial dissolution amount (B) is increased. In view of the foregoing, it is preferred that the silicon polyphosphate or its metal salt to be used in this invention be prepared by (a) calcining a composition comprising the silicic acid component and the phosphoric acid component optionally with the metal component, e.g., an alkali metal, at the above-mentioned ratio at a temperature ranging from 400 to 1000° C. for 20 to 180 minutes to form a clinker of a silicon polyphosphate or its metal salt, (b) pulverizing the clinker into fine particles having a particle size smaller than 100 $\mu$, especially smaller than 50 $\mu$ and calcining the fine particles at a temperature of from 400° to 1000° C. not lower than the calcination temperature adopted at the step (a) for 20 to 180 minutes, and (c) repeating the pulverization-recalcination step (b) according to need.

As the water-soluble or water-dispersible silicate binder to be used for the water glass composition of this invention, there can be employed, for example, (a) one or more of alakli silicate binders such as potassium silicate, sodium silicate and lithium silicate and (b) a silicate binder formed by adding such alkali silicate or an alkali to a fine powder of anhydrous silicic acid or silicate or a hydrosol of silica. In view of the water-solubility or water-dispersibility, it is important that these silicate binders should contain an alkali component. The mole ratio of the silicic acid component and the alkali component is considerably changed, depending on the concentration, but in general, it is preferred that the mole ratio of the silicate binder be within a range represented by the following formula:

$$M^2_2O \cdot kSiO_2$$

wherein $M^2$ stands for an alkali metal and $k$ is a number of from 1 to 5, preferably from 2 to 4.

Commercially available aqueous solutions of sodium silicate can be effectively used in this invention. In accordance with another preferred embodiment of this invention, however, there is employed an alkali silicate binder in which the mole ratio of the oxide of the silicic acid component to the oxide of the alkali metal component is from 3.50 to 4.5, especially from 3.50 to 3.75 and the dehydrated gel proportion FG (%) defined by the following formula:

$$FG = \frac{Co - C}{Co} \times 100$$

wherein Co stands for a weight (g), as dry base, of solids obtained by dispersing 100 g of the alkali silicate binder of $SiO_2$ concentration of 25 to 30% in 150 ml of kerosine in a mixer under a high speed agitation of at least 1000 rpm, adding thereto 50 ml of methanol and recovering resulting precipitates by filtration, and C designates a weight (g), as dry base, of a portion of said precipitates passable through a 3-mesh sieve (Tyler sieve), is at least 50%, especially at least 80%. When this alkali silicate binder is employed, the mechanical strength, especially the strength in the wet state, can be highly improved in final coatings, bonded structures or molded structures.

This alkali silicate binder capable of providing a highly improved mechanical strength is prepared by using as the starting material activated silicic acid (a hydrosol, hydrogel or zerogel of silica) obtained by the acid method or by acid-treating an aluminosilicate clay mineral, reacting this activated silicic acid with a hydroxide, carbonate or bicarbonate of an alkali metal in presence of water and, if desired, separating insoluble fine particles from the resulting slurry by filtration.

As the activated silicic acid, there can be used, for example, hydrosols, hydrogels and xerogels of silica obtained as by-products when various slags such as blast furnace slag from iron sand slag are extracted with acids such as sulfuric acid and hydrochloric acid.

As the aluminosilicate clay, there can be employed, for example, various crystalline and amorphous clay minerals, such as allophane, pyrophyllite, talc, montmorillonite, chlorite, kaolinite and polygorskite. Among these clays, montmorillonite clay minerals such as Japanese acid clay and sub-bentonite are preferably employed.

In order to impart to these clay minerals as activity necessary for the reaction with the alakli metal component and control the content of the insoluble component in the final alkali silicate binder within the above-mentioned range, these clay minerals are treated with a mineral acid such as sulfuric acid, hydrochloric acid and nitric acid or an organic acid. The acid treatment conditions are so selected that the BET specific surface area of the resulting activated silicic acid is at least 150 m$^2$/g. For instance, an acid is generally used in an amount of 1 to 2 equivalents to the whole basic components in the starting clay mineral and the acid treatment is generally carried out at 70° to 140° C. for 0.5 to 24 hours. Any of treatment methods previously proposed by us, for example, the wet granule acid treating method (see Japanese Pat. publication No. 335/48), the dry activation treatment method (see Japanese Patent Publication No. 11208/70) and the slurry acid treating method (see Japanese Pat. Publication No. 11209/70) can be applied to the above acid treatment.

In order to prevent undesired discoloration of the alkali silicate binder by organic impurities contained in the starting clay mineral, such organic impurities may be removed, before or after the above acid treatment, by calcining the starting clay at 500 to 900° C. or by extraction using an aqueous solution of an alkali having a concentration of 3 to 20%.

The so obtained activated silicic acid is reacted with the alkali metal component in the presence of water. The amount of the alkali metal component is so selected that the $M^2_2O : SiO_2$ mole ratio is within the above-mentioned range. The reaction between the activated silicic acid component and alkali metal component is an exothermic neutralization reaction. Accordingly, when both the components are mixed in the presence of water, the reaction proceeds with violent generation of heat, and an alkali silicate binder containing fine particles of an insoluble alkali silicate or aluminosilicate in a specific amount mentioned below can be obtained without performing external heating particularly. The resulting alkali silicate solution may be diluted or concentrated to obtain a desired concentration. Instead of the method for obtaining a concentrated alkali silicate binder solution directly by the above reaction, there may be adopted a method in which the activated silicic acid component is suspended in water, a necessary amount of the alkali metal component is added to the suspension and both the components are reacted under heating.

The so obtained alkali silicate binder contains 1 to 30% by weight, especially 1 to 15% by weight, of insoluble alkali silicate or aluminosilicate fine particles. The binder may be used either in the state containing these insoluble particles or after they have been removed by filtration or the like.

A commercially available alkali silicate binder has an alkali metal content higher than in the above-mentioned high-strength alkali silicate binder and is entirely a homogeneous solution. When this homogeneous solution is added to a liquid mixture of kerosine and methanol under agitation, dehydration of the alkali silicate is caused and a powdery or fine particulate solid of the alkali silicate is obtained. On the other hand, when the above-mentioned alkali silicate in the form of an aqueous solution which is used in the preferred embodiment of this invention is dehydrated by methanol in a suspension in kerosine in the above-mentioned manner, the alkali silicate binder is solidified in a doughbody-like form or a form of a mass having plasticity and it can hardly be obtained in the form of a powder of fine particle. This fact indicates that the alkali silicate binder preferably employed in this invention has a polyfunctional moiety or nucleus capable of gelling under the dehydrating condition the water-soluble alkali silicate to form a continuous net-like, i.e., three-dimensional, structure. It is believed that the mechanical strength is highly improved by the above-mentioned alkali silicate binder according to this peculiar mechanism.

In order to improve rheological properties of the water-soluble or water-dispersible silicate binder to be used in this invention, it is possible to incorporate a known additive in an amount of up to 100% by weight based on the silicate binder as $SiO_2$. As such additive, there can be employed, for example, metal oxides and hydroxides such as calcium oxide, magnesium oxide, zinc oxide, aluminum oxide, magnesium hdyroxide, calcium hydroxide and aluminum hydroxide, metal silicates such as calcium silicate, magnesium silicate, zinc silicate and aluminum silicate and metal silicofluorides such as aluminum silicofluoride.

The water glass composition of this invention preferably contains 5 to 50% by weight, especially 10 to 40% by weight, of the water-soluble or water-dispersible silicate binder as calculated as $SiO_2$, though the preferred concentration is changed to some extent depending on the use. In case the water glass composition is used for formation of molded structures or bonded structures, the composition is used in a relatively high viscous state, and in this case, the composition may contain the silicate binder at such a high concentrations as 25 to 50% by weight as calculated as $SiO_2$. In case the water glass composition is used for coating or painting, the composition may be in a relatively low viscous state, and in this case, the composition may contain the silicate binder at such a low concentration as 5 to 40% by weight as calculated as $SiO_2$.

In the water glass composition of this invention, the proportion of the amount used of the curing agent composed mainly of a silicon polyphosphate or its metal salt to the above-mentioned water-soluble or water-dispersible silicate binder (as $SiO_2$) can be optionally chosen and it is not particularly critical. However, it is generally preferred that the amount used of the silicon polyphosphate or its metal salt as $P_2O_5$ is 10 to 150% by weight, especially 30 to 100% by weight, based on the silicate binder as $SiO_2$. In case the amount of the curing agent as $P_2O_5$ is smaller than 10% by weight of the binder as $SiO_2$, the intended high room temperature curing speed cannot be attained after completion of the application operation. In case the amount of the curing agent as $P_2O_5$ is larger than 150% by weight based on $SiO_2$, the intended object of this invention, namely the object of preventing premature gelation in a time necessary for the application operation such as molding, bonding or coating can hardly be attained. Moreover, final products prepared by using such water glass composition are inferior to products prepared by using a water glass composition containing the curing agent in the above-mentioned amount with respect to mechanical properties such as adhesion and toughness and chemical properties such as water resistance, weatherability and flame resistance.

Various additives may be added to the water glass composition of this invention appropriately depending on intended uses of the composition, generally in amounts of 10 to 800% by weight based on the binder as $SiO_2$. These additives will now be described.

As a reinforcer, there may be employed, for example, fibrous reinforces such as staples, slivers, mats, woven fabrics and non-woven fabrics of glass fiber, rock wool, slag wool, asbestos, carbon fiber and metal fiber, and finely divided particulate reinforces such as carbon black, glass powder, white carbon and silica powder. As a filler, there may be employed various inorganic fillers such as kaoline, calcinated clay, acid clay, activated clay, titanium dioxide, zirconium dioxide, alumina powder, barium sulfate, magnesium carbonate, calcium carbonate, zinc oxide, gypsum and sand.

As a pigment, there can be employed not only white pigments such as titanium oxide but also coloring pigments such as chrome yellow, red iron oxide, ultramarine, chrome green, mars violet and carbon black.

In order to improve the dispersibility of the adaptability to impregnation or coating of the water glass composition of this invention, it is possible to incorporate a surface active agent in such an amount as will not degrade the properties of the composition.

The kinds and amounts of the foregoing additives should naturally be selected so that the working and curing characteristics of the water glass composition are not degraded.

The water glass composition of this invention may be used for production of various molded articles. For instance, the water glass composition may be effectively used, in combination with a fibrous or particulate reinforcer or filler, for production of various flame-retardant molded structures such as construction materials, e.g., roofing materials, tiles for inner or outer decoration, hollow wall materials, floor materials, partition materials, sound-insulating materials and refractory coatings for iron materials for multistory buildings furniture such as tables and chairs, table wares and other household containers or vessels, various decorative articles, structural materials, e.g., pipes, sheets, blocks, beams, columns and casings, and various molds for casting or the like.

Moreover, the water glass composition of this invention can be effectively used for preparing bonded assemblies and structures by bonding various ceramics such as glass, brick, slate, block and porcelain or metals.

Still further, the water glass composition of this invention may be used for imparting incombustibility or water-impermeability to bricks, china wares, concrete articles, wood, paper and other fibrous articles by subjecting them to the impregnation or surface treatment with the water glass composition. The water glass composition can be coated on surfaces of eggs to prolong their shell lives.

Still in addition, the water glass composition of this invention, optionally with a filler or pigment, may be used as a protective paint, rust-preventive paint or flame retardant paint for various inorganic substrates such as metal substrates, wood substrates, concrete, slate and asbestos plates.

The water glass composition of this invention has a relatively low viscosity suitable for the application operation within a time of 1 to 8 hours necessary for completion of such operation as molding, bonding or coating regardless of the application form or state of the composition. Further, the water glass composition has a very high room temperature curing rate after completion of the above application operation. This characteristic property is very advantageous for preparation of molded or bonded structures. Of course, a molded structure, bonded structure or coated article formed by using the water glass composition of this invention may be heated at, for example, 60° to 200° C., if it is desired to advance curing at a higher rate, but in general, such heat treatment need not be performed.

The water glass composition of this invention can be effectively used in various fields such as mentioned above. It must be noted that an excellent paint or adhesive is prepared from the water glass composition of this invention.

Conventional inorganic paints and adhesives have a good adhesion to rough surfaces, but their adhesive property to substrates having a relatively smooth surface such as metal substrates, e.g., steel plates is not satisfactory. We therefore conducted research on the adhesive characteristics of the water glass composition of this invention with a view to developing a paint or adhesive overcoming this defect involved in the conventional inorganic paints and adhesives. As a result, it was found that when an inorganic anchoring agent in which particles having a size larger than 1 $\mu$ occupy less than 10% of the total particles and particles having a size smaller than 0.5 $\mu$ occupy more than 50% of the total particles and a polyvalent metal silicate in which particles having a size larger than 80 $\mu$ occupy less than 10% of the total particles and particles having a size smaller than 20 $\mu$ occupy more than 50% of the total particles are used in combination as the filler and incorporated in the water glass composition of this invention, the amount of the anchoring agent being 10 to 300% by weight based on the silicate binder as $SiO_2$ and the amount of the polyvalent metal silicate being 5 to 500% by weight based on the silicate binder as $SiO_2$, there is obtained an adhesive or painting composition which retains excellent heat resistance, incombustibility and hardness inherent of an inorganic adhesive or paint comprising water glass as a binder and which has a much improved adhesive property.

This feature will now be described.

The water-resistant adhesion strength to metal substrate is determined, for example, according to the method K-6852 of Japanese Industrial Standards (JIS), as detailed in Example 4 given hereinafter.

The compression shear strength of a bonded structure formed by using a water glass composition free of a filler is substantially zero after water dipping, and when a filler outside the scope of this invention, for example, clay or calcium carbonate, is employed, the compression shear strength after water dipping is generally lower than 3 Kg/cm², as shown in Table II given hereinafter. In contrast, if iron oxide (III) having the above-mentioned specific size distribution is used as the anchoring agent and a polyvalent metal silicate having the above-mentioned specific size distribution is used in combination with the anchoring agent, the compression shear strength of the bonded structure formed by using this water glass composition is surprisingly improved to a level of at least 10 Kg/cm², even up to 40 Kg/cm² in some cases.

Any of inorganic particulate substances having the above-mentioned size distribution and an anchoring effect to the bonded interface can be used as the inorganic anchoring agent. A most preferred instance of such anchoring agent is iron oxide (III) having the above-mentioned size distribution. In addition, other iron oxides such as iron oxide (II) and triiron tetroxide may also be used as far as they have the above-mentioned particle size distribution.

Another preferred instance of the inorganic anchoring agent include inorganic polishing materials having the above-mentioned particle size distribution, especially those that are inactive at least at the initial stage when they are mixed into a medium of the above-mentioned silicate binder. As such inorganic polishing material, there can be mentioned, for example, finely divided calcined alumina, chromium oxide (III), titanium oxide (IV), zinc oxide, silicon oxide, litharge and glass powder. Still further, molten alumina, silicon carbide, boron carbide, boron nitride, titanium nitride and other high-hardness carbides and nitrides can be used in this invention, as far as they have the above-mentioned particle size distribution. Still in addition, naturally occurring minerals such as quartz powder, zircon sand, ilmenite, iron sand, silica powder, phosphate rock and garnet can be used, as far as the above-mentioned requirement of the particle size distribution is satisfied.

As the polyvalent metal silicate to be used in combination with the inorganic anchoring agent for improving the adhesive characteristics of the water glass composition of this invention, there can be mentioned silicates of alkaline earth metals such as magnesium, calcium and barium, zinc, aluminum, iron, lead and chromium. In these silicates, the ratio of the metal component and the silicic acid component can be changed relatively broadly within a range represented by the following formula:

$RO_{k/2} \cdot qSiO_2$ wherein R is a polyvalent metal selected from the group consisting of metals of groups II, III and IV of the Periodic Table and transition metals, k stands for the valency of the metal R, and q is a number of from 0.1 to 2, especially from 0.2 to 1.5.

In this invention, both silicates of the normal salt form and basic silicates can be used in this invention.

In order to improve the water-resistant adhesion strength of the water glass composition, it is important that this polyvalent metal silicate should have such a particle size distribution that particles having a size larger than 80 $\mu$ occupy less than 10% of the total particles and particles having a size smaller than 20 $\mu$ occupy more than 50% of the total particles, and it is generally preferred that the surface area of the polyvalent metal silicate be less than 100 m²/g, especially 50 m²/g. If the particle size distribution of the polyvalent metal silicate is outside the above-mentioned range, the degree of the improvement of the water-resistant adhesion strength in the water glass composition is not so high.

Another type of the polyvalent metal silicate suitable for improving the adhesive characteristics of the water glass composition includes particulate products obtained by intimately mixing a silicic acid component starting material such as a hydrosol, hydrogel or xerogel of silicic acid or a fine ultrafine powder of crystalline anhydrous silicic acid with an oxide, hydroxide or carbonate of the polyvalent metal in the presence of water so that the composition requirement represented by the above formula is satisfied, calcining the mixture at a temperature of 300° to 1200° C., preferably 500° to 1000° C., and wet-pulserizing or dry-pulverizing the calcined product according to need.

When a combination of an inorganic anchoring agent having the specific particle size distribution and a polyvalent silicate having the specific size distribution is incorporated in a specific amount as the filler into the water glass composition of this invention, the adhesive characteristics to smooth surface metal substrates can be highly improved. In order to attain this improvement, it is important that an anchoring agent having the above-mentioned particle size distribution, such as iron oxide (III), should be used in an amount of 10 to 300% by weight, especially 30 to 200% by weight, based on the silicate binder as $SiO_2$ and a polyvalent metal silicate having the above-mentioned particle size distribution should be used in an amount of 5 to 500% by weight, especially 10 to 300% by weight, based on the silicate binder as $SiO_2$. In case iron oxide (III) having the above-mentioned particle size distribution is singly incorporated in water glass composition, the above-mentioned compression shear strength after water dipping is in an order of 2.0 Kg/cm² as is seen from Table II given hereinafter (see sample SC-2). In contrast, if this anchoring agent is used in combination with the above-mentioned polyvalent metal silicate, the compression shear strength after water dipping is much higher than the arithmetric sum of both the components and is as high as 44 Kg/cm². Thus, it will readily be understood that when the anchoring agent such as iron oxide (III) is used in combination with the polyvalent metal silicate, an unexpected synergistic effect can be attained in improving the water-resistant adhesion of the water glass composition of this invention.

In general, it is preferred that the weight ratio of the inorganic anchoring agent and the polyvalent metal silicate be within the range of from 1 : 0.3 to 1 : 3, especially from 1 : 0.5 to 1 : 2.

This invention will now be illustrated in more detail by reference to the following Examples, in which all of "%" are by weight.

Referential Example 1

In this Referential Example, a curing agent comprising as the main ingredient a silicon polysilicate or its alkali metal salt which is used for a water glass composition is illustrated.

The following three substances were chosen as the starting silicic acid component. Namely, two partially dealkalized sodium silicate aqueous solutions and one silicic acid gel were prepared from commercially available sodium silicate (water glass No. 3 specified by JIS; $Na_2O$ content = 12.9 g/100 ml; $SiO_2$ content = 37.0 g/100 ml). More specifically, the above commercially available sodium silicate was diluted with water so that the concentration of sodium silicate as $SiO_2$ was reduced to 0.3 mole/liter and passed through a column packed with a cation exchange resin at a rate of 10 ml/min. The pH of the solution was adjusted to 10.0 or 3.0 when it was recovered. The solution recovered at a pH of 10.0 was designated as solution I and the solution recovered at a pH of 3.0 was designated as solution II. Results of the analysis of these solutions I and II are as follows:

Solution I
 $SiO_2$ content: 1.72 g/100 ml
 $Na_2O$ content: 0.91 g/100 ml
Solution II
 $SiO_2$ content: 1.84 g/100 ml
 $Na_2O$ content: 0.007 g/100 ml The silicic acid gel was prepared by adding the above-mentioned commercially available sodium silicate dropwise to a 10% aqueous solution of sulfuric acid heated at 90° C., causing the reaction on an acidic side, removing sodium and sulfuric acid ions from the resulting granular silica gel by washing it until the presence of sodium ions was not substantially detected in the washing liquid, and recovering the dealkalized silica gel, which was designated as silica gel III.

Commerically available phosphoric acid (86% $H_3PO_4$ of first grade specified by JIS; specific gravity = 1.69) was added to each of the above starting silicic acid component in an amount, as calculated as $P_2O_5$, of 0.33 mole per mole of the silicic acid component as $SiO_2$. The mixture was concentrated and dried by heating, and calcined at 900° C. for 1 hour. Each calcination product was pulverized and passed through a 200-mesh (74 $\mu$) sieve is effect classification. Thus, there were obtained three pulverized curing agents of silicon polyphosphate or its alkali metal salt (samples H-1, H-2 and H-3).

The initial dissolution amount (B) of phosphoric acid and average hydrolysis rate constant (A) of each of the so obtained three curing agents were determined to obtain results shown in Table 1.

Table 1

| Starting Silicic Acid Component | Sample No. | Initial Dissolution Amount (B) (mg) of Phosphoric Acid | Average Hydrolysis Rate Constant (A) |
|---|---|---|---|
| sodium silicate solution of pH of 10.0 | H-1 | 32 | 0.62 |
| sodium silicate solution of pH of 3.0 | H-2 | 88 | 0.78 |
| dealkalized silica gel | H-3 | 101 | 0.99 |

Table 1-continued

| Starting Silicic Acid Component | Sample No. | Initial Dissolution Amount (B) (mg) of Phosphoric Acid | Average Hydrolysis Rate Constant (A) |
|---|---|---|---|

The initial dissolution amount (B) of phosphoric acid and the average hydrolysis rate constant (A) were measured in the following manner:

1.00 g of the sample of the curing agent was added to 100 ml of a 4N aqueous solution of sodium hydroxide, and the mixture was agitated at room temperature (25° C.). After passage of 5 minutes or 20 minutes, the mixture was filtered by using a filter paper and the content of the phosphoric acid component as $P_2O_5$ in the filtrate was determined by the colorimetric method. The amounts (mg/100 ml) of the phosphoric acid dissolved out after 5 minutes and 120 minutes were plotted on a graph in which the time (minutes) was shown on the ordinate and the dissolved amount (mg/100 ml) was shown on the abscissa, and these values were substituted for the formula $Y = AX + B$ to calculate the initial dissolution amount (B) of phosphoric acid and the average hydrolysis rate constant (A).

Referential Example 2

In this Referential Example, curing agents differing in the mole ratio of the silicic acid component and phosphoric acid component are illustrated.

The partially dealkalized sodium silicate solution I and silica gel III prepared on an acidic side, which were used in Referential Example 1, were employed as the starting silicic acid component.

The same commercially available phosphoric acid of first grade as used in Referential Example 1 was employed as the phosphoric acid component.

The following 4 mole ratios of the silicic acid component and phosphoric acid component were chosen; namely, 2 : 1, 4 : 1, 6 : 1 and 8 : 1, expressed as $SiO_2 : P_2O_5$.

Curing agents were prepared in the same manner as described in Referential Example 1 and calcination was carried out at 900° C. for 1 hour. In this manner, there were obtained 8 silicon phosphate binders (samples H-4, H-5, H-6, H-7, H-8, H-9, H-10 and H-11).

The initial dissolution amount (B) of phosphoric acid and the average hydrolysis rate constant (A) were measured with respect to each of these 8 silicon polyphosphates to obtain results shown in Table 2.

Table 2

| Mole Ratio ($SiO_2:P_2O_5$) | Starting Silic Acid Component | Sample No. | Initial Dissolution Amount (B) (mg) | Average Hydrolysis Rate Constant (A) |
|---|---|---|---|---|
| 2 : 1 | Solution I | H-4 | 30 | 1.04 |
|  | Silica gel III | H-5 | 193 | 1.02 |
| 4 : 1 | Solution I | H-6 | 43 | 0.42 |
|  | Silica gel III | H-7 | 97 | 1.08 |
| 6 : 1 | Solution I | H-8 | 72 | 0.33 |
|  | Silica gel III | H-9 | 66 | 1.12 |
| 8 : 1 | Solution I | H-10 | 85 | 0.31 |
|  | Silica gel III | H-11 | 47 | 1.16 |

Referential Example 3

In this Referential Example, curing agents composed mainly of a silicon polyphosphate alkali metal salt are illustrated.

As the starting silicic acid component, the dealkalized silica gel III prepared on an acidic side, which was used in Referential Example 1, was chosen.

Sodium hydroxide or potassium hydroxide was added to the silica gel III in an amount, as $Na_2O$ or $K_2O$, of 1, 3, 5, 7 or 10% based on the silicic acid component as $SiO_2$, and the mixture was sufficiently blended and heat-treated at 200° C. for 1 hour.

The same commercially available phosphoric acid of first grade as used in Referential Example 1 was added to the resulting reaction product in an amount, as calculated as $P_2O_5$, of 0.25 or 0.33 mole per mole of the starting silicic acid component as $SiO_2$, and the mixture was calcined at 900° C, for 2 hours and the calcination product was pulverized. In this manner, 15 silicon polyphosphate alkali metal salts (samples H-12 to H-26) were prepared.

The average idssolution amount (B) of phosphoric acid and the average hydrolysis rate constant (A) were measured with respect to each of the so prepared 15 silicon polyphosphate alkali metals to obtain results shown in Table 3.

(having a oxide composition of 94.3% of $SiO_2$, 1.49% of $Al_2O_3$ and 0.39% of $Fe_2O_3$ and an ignition loss of 3.36%) obtained by treating a montmorillonite type acid clay radically with sulfuric acid to remove acid-soluble basic components.

As the silicate, there were chosen the following 7 silicates; namely, aluminum silicate [$Al_2Si_4O_{10}(OH)_2$], calcium silicate ($CaO \cdot 2SiO_2$), magnesium silicate ($Mg_2Si_3O_8 \cdot 2H_2O$), sodium silicate ($0.1Na_2O \cdot SiO_2$), zinc silicate ($ZnO \cdot 6SiO_2$), barium silicate ($BaO \cdot 4SiO_2$) and zirconium silicate ($ZrO_2 \cdot SiO_2$).

As the clay mineral, there were chosen the following 5 mineral substances; namely, kaoline as a phillosilicate biostrome bonded substance (comprising as the main components in the dry state 79.4% of $SiO_2$, 17.6% of $Al_2O_3$, 0.38% of CaO, 0.26% of MgO and 0.02% of $Fe_2O_3$ and having an ignition loss of 3.15%), a montmorillonite Japanese acid clay as clay mineral (comprising as the main components in the dry state, 78.7% of $SiO_2$, 13.1% of $Al_2O_3$, 0.57% of $Fe_2O_3$, 1.13% of CaO and 3.50% of MgO and having an ignition loss of 3.15%), naturally occurring zeolite (comprising as the main components 66.1% of $SiO_2$, 11.9% of $Al_2O_3$, 0.40% of $Fe_2O_3$, 2.03% of CaO, 0.04% of MgO, 0.04% of $TiO_2$, 2.07% of $Na_2O$ and 2.05% of $K_2O$ and having an ignition loss of 15.9%), diatomaceous earth as a naturally occurring amorphous silicate (comprising as the main Table 3

| Amount (%) of Alkali Metal | Kind of Alkali Metal | $P_2O_5/SiO_2$ Mole Ratio | Sample No. | Initial Dissolution Amount (B) | Average Hydrolysis Rate constant (A) |
|---|---|---|---|---|---|
| 1 | Na | 0.25 | H-12 | 88 | 1.03 |
|   |    | 0.33 | H-13 | 94 | 0.82 |
|   | K  |      | H-14 | 91 | 0.79 |
| 3 | Na | 0.25 | H-15 | 34 | 0.98 |
|   |    | 0.33 | H-16 | 42 | 0.63 |
|   | K  |      | H-17 | 40 | 0.65 |
| 5 | Na | 0.25 | H-18 | 31 | 0.97 |
|   |    | 0.33 | H-19 | 33 | 0.62 |
|   | K  |      | H-20 | 31 | 0.62 |
| 7 | Na | 0.25 | H-21 | 55 | 0.97 |
|   |    | 0.33 | H-22 | 56 | 0.77 |
|   | K  |      | H-23 | 54 | 0.78 |
| 10 | Na | 0.25 | H-24 | 87 | 1.05 |
|    |    | 0.33 | H-25 | 82 | 0.84 |
|    | K  |      | H-26 | 85 | 0.87 |

Referential Example 4

In This Referential Example, various curing agents composed mainly of a silicon polyphosphate or its alkali metal salt, which were prepared by using various silicic acids, silicates, their alkali metal salts or clay minerals as the starting silicic acid component, are illustrated.

As the silicic acid, there were employed the following silicic acids; namely, a silica powder (having an oxide composition of 99.9% of $SiO_2$, 0.04% of $Al_2O$ and 0.008% of $Fe_2O$) obtained by finely pulverizing silica sand produced in Australia and sieving the pulverized product to a particle size not exceeding 10 $\mu$, a powdery xerogel of silica gel (having an oxide composition of 97.0% of $SiO_2$ and 3.0% of $Al_2O_3$) obtained by a calcining a granular silica gel commercially available as a drying adsorbent at 300° C., pulverizing the calcination product and sieving the pulverized product to a size not exceeding 10 $\mu$, a finely divided silica of a particle size not exceeding 0.1 $\mu$ commercially available as a filler for plastics such as rubbers (so-called white carbon), and and acid-treated Japanese acid clay components 79.6% of $SiO_2$, 6.37% of $Al_2O_3$, 3.03% of $Fe_2O_3$, 0.16% of CaO and 1.13% of MgO and having an ignition loss of 8.36%) and talc belonging to a phillosilicate mineral (comprising as the main components 61.7% of $SiO_2$, 30.5% of MgO, 0.63% of $Al_2O_3$ and 1.95% of $F_2O_3$ and having an ignition loss of 5.50%).

Sodium hydroxide was added to the silicic acid or silicate in an amount, as calculated as $Na_2O$, of 3% based on the silicic acid component as $SiO_2$, and the mixture was treated at 200° C. to prepare an alkali metal-incorporated silicic acid or silicate. Both the alkali metal-free silicic acid or silicate and the alkali metal-incorporated silicic acid or silicate were used and results obtained were compared.

The same commercially available phosphoric acid of first grade as used in Referential Example 1 was employed as the starting phosphoric acid component.

In each case, the mole ratio of the phosphoric acid component and silicic acid component, expressed as $SiO_2 : P_2O_5$, was adjusted to 3 : 1.

Curing agents were prepared by using the foregoing starting materials in the same manner as described in Referential Example 1, and calcination was carried out at 900° C. for 2 hours, followed by pulverization. In this manner, there were prepared 27 curing agents of a silicon polyphosphate or its alkali metal salt (samples H-27 to H-53).

The initial dissolution amount (B) of phosphoric acid and the average hydrolysis rate constant (A) were measured with respect to each of these curing agents to obtain results shown in Table 4.

sodium hexametaphosphate $[(NaPO_3)_6]$, potassium metaphosphate $(KPO_3)$, potassium orthophosphate $(K_3PO_4)$, sodium tripolyphosphate $(Na_5P_3O_5)$, sodium phosphite $(Na_2HPO_3 \cdot 5H_2O)$, potassium hypophosphite $(KH_2PO_2)$, zinc phosphate $(ZnHPO_4)$, magnesium phosphate $(MgHPO_4)$, aluminum phosphate $(AlPO_4 \cdot nH_2O)$, iron phosphate $(FePO_4 \cdot nH_2O)$ and calcium phosphate $[Ca(H_2PO_4)_2 \cdot 2H_2O]$.

Table 4

| Starting Silicic Acid Component | Addition of Sodium Hydroxide | Sample No. | Initial Dissolution Amount (B) | Average Hydrolysis Rate Constant (A) |
|---|---|---|---|---|
| Fine Silica Powder | not effected | H-27 | 134 | 1.12 |
|  | effected | H-28 | 64 | 0.77 |
| Silica Xerogel Powder | not effected | H-29 | 107 | 1.02 |
|  | effected | H-30 | 33 | 0.66 |
| Finely Divided Silica | " | H-31 | 98 | 0.97 |
|  |  | H-32 | 31 | 0.64 |
| Acid-Treated Japanese Acid Clay | " | H-33 | 102 | 1.10 |
|  |  | H-34 | 36 | 0.65 |
| Aluminum Silicate | " | H-35 | 185 | 0.42 |
|  |  | H-36 | 165 | 0.38 |
| Calcium Silicate | " | H-37 | 105 | 0.65 |
|  |  | H-38 | 77 | 0.53 |
| Magnesium Silicate | " | H-39 | 175 | 0.58 |
|  |  | H-40 | 155 | 0.33 |
| Sodium Silicate | not effected | H-41 | 96 | 1.12 |
|  | effected | H-42 | 105 | 0.92 |
| Zinc Silicate | " | H-43 | 186 | 0.85 |
|  |  | H-44 | 163 | 0.58 |
| Barium Silicate | " | H-45 | 104 | 0.67 |
|  |  | H-46 | 73 | 0.56 |
| Zirconium Silicate | " | H-47 | 32 | 0.42 |
|  |  | H-48 | 27 | 0.38 |
| Kaoline | not effected | H-49 | 194 | 0.52 |
| Japanese Acid Clay | not effected | H-50 | 127 | 0.67 |
| Zeolite | not effected | H-51 | 66 | 0.57 |
| Diatomaceous Earth | not effected | H-52 | 175 | 0.62 |
| Talc | not effected | H-53 | 190 | 0.58 |

Referential Example 5

In this Referential Example, various curing agents of a silicon polyphosphate alkali metal salt prepared by using various phosphorus oxyacids and phosphorus oxyacid salts as the starting phosphoric acid component are illustrated.

The same dealkalized sodium silicate solution I and silica gel III as used in Referential Example 1 are employed as the starting silicic acid component.

As the starting phosphoric acid component, there were chosen the following 19 substances; namely, so-called crude phosphoric acid obtained by decomposing phosphate rock with sulfuric acid (containing 24.9% of $P_2O_5$, 1.19% of $Fe_2O_3 + Al_2O_3$ and 1.54% of CaO), commercially available phosphorous oxyacids of chemical grade, i.e., anhydrous phosphoric acid $(P_2O_5)$, metaphosphoric acid $(HPO_3)$, pyrophosphoric acid $(H_4P_2O_7)$ and phosphorous acid $(H_3PO_3)$, and commercially available phosphorus oxyacid salts of chemical grades, i.e., monoammonium oethophosphate $(NH_4H_2PO_4)$, monosodium orthophosphate $(NaH_2PO_4 \cdot H_2O)$, sodium pyrophosphate $(Na_4P_2O_7 \cdot 10H_2O)$, In case an alkali metal salt was used as the starting phosphoric acid component, the silica gel III was chosen as the starting silicic acid component, and the akali metal was added thereto in the form of the phosphorus oxyacid alkali metal salt in an amount as $Na_2O$ or $K_2O$ of 4.0% based on the silica gel III as $SiO_2$ and commercially available phosphoric acid of first grade (85% concentration) was added to the mixture in the presence of water so that the $SiO_2$:$P_2O_5$ mole ratio in the entire mixture was 3 : 1. In the case of other phosphoric acid component, the dealkalized sodium silicate solution I was chosen as the starting silicic acid components and both the starting components were mixed so that the $SiO_2$ : $P_2O_5$ mole ratio was 3 : 1. Each of the so prepared mixtures was dried and concentrated according to need, and it was calcined at 900° C. for 3 hours and pulverized. In this manner, there were obtained 19 silicon polysilicate alkali metal salt curing agents (samples H-54 to H-72).

The initial dissolution amount (B) of phosphoric acid and the average hydrolysis rate constant (A) were measured with respect to these 19 curing agents to obtain results shown in Table 5.

Table 5

| Starting Silicic Acid Component | Starting Phosphoric Acid Component | Sample No. | Initial Dissolution Amount (B) | Average Hydrolysis Rate Constant (A) |
|---|---|---|---|---|
|  | crude phosphoric acid | H-54 | 44 | 0.64 |
|  | anhydrous phosphoric acid | H-55 | 38 | 0.61 |
|  | metaphosphoric acid | H-56 | 35 | 0.63 |
| Dealkalized | pyrophosphoric acid | H-57 | 30 | 0.67 |
| Sodium | phosphorous acid | H-58 | 33 | 0.71 |
| Silicate | monoammonium orthophosphate | H-59 | 37 | 0.65 |
| Solution II | zinc phosphate | H-60 | 105 | 0.58 |
|  | magnesium phosphate | H-61 | 178 | 0.49 |
|  | aluminum phosphate | H-62 | 189 | 0.42 |
|  | iron phosphate | H-63 | 75 | 0.65 |

Table 5-continued

| Starting Silicic Acid Component | Starting Phosphoric Acid Component | Sample No. | Initial Dissolution Amount (B) | Average Hydrolysis Rate Constant (A) |
|---|---|---|---|---|
| Silica gel III | calcium phosphate | H-64 | 78 | 0.58 |
| | monosodium orthophosphate | H-65 | 32 | 0.64 |
| | sodium pyrophosphate | H-66 | 34 | 0.64 |
| | sodium hexametaphosphate | H-67 | 33 | 0.63 |
| | potassium metaphosphate | H-68 | 32 | 0.60 |
| | potassium orthophosphate | H-69 | 31 | 0.61 |
| | sodium tripolyphosphate | H-70 | 35 | 0.67 |
| | sodium phosphite | H-71 | 36 | 0.65 |
| | potassium hypophosphite | H-72 | 34 | 0.66 |

Referential Example 6

Influences of the heat treatment conducted in preparing curing agents of a silicon phosphate or its alkali metal salt are illustrated in this Referential Example.

Both the starting components used in Referential Example 1 for preparing curing agent sample H-1, H-2 or H-3 were concentrated and dried by heating, and the dried and concentrated mixture was calcined at 500, 600, 750, 800 and 950° C. for 3 hours and then pulverized. Thus 15 curing agents (samples H-73 to H-87) were prepared.

In order to further proceed condensation of the silicon polyphosphate, sample H-5 treated at 900° C. and sample H-73 treated at 500° C. were pulverized to a particle size not exceeding 74 μ and heat-treated again deliberately at 900° C. for 2 hours to obtain samples H-88 and H-89.

The initial dissolution amount (B) of phosphoric acid and the average hydrolysis rate constant (A) were measured with respect to each of the so prepared 17 curing agents to obtain results shown in Table 6.

From the results shown in Table 6, it is seen that samples H-73, H-74, H-75, H-76, H-77 and H-78 did not satisfy the requirement of the initial dissolution amount (B) of phosphoric acid specified in this invention.

In contrast, as is apparent from the above data, in samples H-88 and H-89, condensation of the silicon polyphosphate was advanced sufficiently and the amount dissolved of the phosphoric acid component was much reduced.

Table 6

| Heat Treatment Temperature (° C.) | Starting Mixture | Sample No. | Initial Dissolution Amount (B) | Average Hydrolysis Rate Constant (A) |
|---|---|---|---|---|
| 500 | H-1 | H-73 | 275 | 0.60 |
| | H-2 | H-74 | 288 | 0.55 |
| | H-3 | H-75 | 332 | 0.16 |
| 600 | H-1 | H-76 | 218 | 0.89 |
| | H-2 | H-77 | 226 | 0.94 |
| | H-3 | H-78 | 245 | 1.06 |
| 750 | H-1 | H-79 | 118 | 0.62 |
| | H-2 | H-80 | 129 | 0.74 |
| | H-3 | H-81 | 148 | 0.80 |
| 800 | H-1 | H-82 | 53 | 0.52 |
| | H-2 | H-83 | 66 | 0.58 |
| | H-3 | H-84 | 72 | 0.58 |
| 950 | H-1 | H-85 | 25 | 0.31 |
| | H-2 | H-86 | 27 | 0.32 |
| | H-3 | H-87 | 33 | 0.36 |
| re-treated at 900° C. | H-3 | H-88 | 20 | 0.25 |
| | H-73 | H-89 | 18 | 0.25 |

Referential Example 7

Comparative phosphate curing agents are illustrated in this Referential Example.

The following 11 phosphates were chosen as the comparative samples. Namely, as commercially available phosphates of chemical grade there were used aluminum phosphate ($AlPO_4$) (C-1), magnesium phosphate ($MgHPO_4$) (C-2), zinc phosphate [$Zn_3(PO_4)_2$] (C-3) and calcium phosphate [$Ca_3(PO_4)_2$] (C-4). As the naturally occurring phosphate, there were chosen phosphate rock produced in Florida (having an oxide composition of 45.1% of CaO, 31.2% of $P_2O_5$, 2.30% of $Al_2O_3 + Fe_2O_3$ and 0.63% of $Na_2O + K_2O$) (C-5), and as synthetic phosphates, there were chosen synthetic condensed aluminum phosphate [prepared according to the method described in Journal of Chemical Society of Japan, 92, pages 318–322 (1971) and having an oxide composition of 23.8% $Al_2O_3$, 65.5% of $P_2O_5$ and 10.1% of $H_2O$] (C-6), synthetic aluminum metaphosphate [$Al(PO_3)_3$] (C-7), synthetic titanium pyrophosphate ($TiP_2O_7$) (C-8), synthetic titanium phosphate ($3TiO_2 \cdot P_2O_5$) (C-9), synthetic zirconium phosphate ($ZrP_2O_7$) (C-10) and a synthetic phosphate obtained by calcining aluminum phosphate and calcium phosphate at 500° C. (C-11).

In the same manner as described in Referential Example 1, the initial dissolution amount (B) of phosphoric acid and the average hydrolysis rate constant (A) were measured with respect to each of these 11 phosphates to obtain results shown in Table 7.

Table 7

| Kind of Phosphate | Sample No. | Initial Dissolution Amount (B) | Average Hydrolysis Rate Constant (A) |
|---|---|---|---|
| aluminum phosphate | C-1 | 450 | 0.38 |
| magnesium phosphate | C-2 | 391 | 0.23 |
| zinc phosphate | C-3 | 242 | 1.16 |
| calcium phosphate | C-4 | 11 | 0.04 |
| phosphate rock | C-5 | 26 | 0.03 |
| condensed aluminum phosphate | C-6 | 420 | 0.66 |
| aluminum metaphosphate | C-7 | 435 | 0.54 |
| titanium pyrophosphate | C-8 | 94 | 0.95 |
| titanium phosphate | C-9 | 105 | 1.26 |
| zirconium phosphate | C-10 | 117 | 1.32 |
| calcined zirconium phosphate and calcium phosphate | C-11 | 220 | 2.55 |

EXAMPLE 1

Water glass compositions comprising a curing agent composed mainly of a silicon polyphosphate or its alkali metal salt are illustrated in this Example.

As the water-soluble or water-dispersible silicate binder, there was chosen the same sodium silicate (water glass No. 3 specified by JIS) as used in Referential Example 1 (having a silicic acid concentration of 3.7 g/100 ml as $SiO_2$ and an alkali concentration of 12.9 g/100 ml as $Na_2O$).

As the curing agent for this silicate binder, there were chosen curing agent sample H-1 to H-89 composed mainly of a silicon polyphosphate or its alkali metal salt. As pointed out hereinbefore, samples H-73 to H-78 did not satisfy the requirement of the initial dissolution amount (B) of phosphoric acid specicified in this invention.

Each curing agent was added to the concentrated sodium silicate in an amount of 15 parts by weight per 100 parts by weight of the sodium silicate, and the mixture was agitated at room temperature for two minutes to obtain a water glass composition.

The homogeneousness of each of the so formed compositions was evaluated in the following manner:

The curing agent was added to the silicate binder and the mixture was agitated for 2 minutes and the resulting water glass composition was filtered by using a Saran filter cloth of about 100 mesh. The amount of the composition which passed through the filter cloth was determined, and if this amount was higher than 90%, preferably 95%, the homogeneousness of the composition was judged as being good. In case partial gelation was caused in the water glass composition or the dispersibility of the curing agent was bad, solid residues were left on the filter cloth, and if the amount of the residual solids exceeded 10%, the homogeneousness of the composition was judged as being bad.

The time required for the water glass composition to become a complete solid with no flowability after addition of the curing agent, namely the gelation time, was measured and the pot life of the composition was evaluated based on this gelation time. More specifically, the pot life of the composition was evaluated by adding the curing agent to the silicate binder, agitating the mixture for 2 minutes, allowing the resulting water glass composition to stand still at room temperature (25° C.) and measuring the time required for the composition to lose the flowability as the gelation time. In case solidification was not caused even after passage of 24 hours, the added curing agent was evaluated as having no gelling activity.

The water resistance of the water glass composition after curing was evaluated in the following manner:

The curing agent was added to the silicate binder and the mixture was agitated for 2 minutes and molded into flakes having a thickness of 2 to 3 mm. Then, the flaky composition was solidified at room temperature and allowed to stand still for 4 hours in a drier maintained at 60° C. or to stand still at room temperature (25° C.) for 7 days. Each cured product was thrown into water and after passage of 2 hours, the change of the form of the cured water glass composition was examined. When no change of the form was observed, the water resistance was evaluated as A, and when the form was retained but it was going to break down, the water resistance was evaluated as B. When the solidified composition broke down but it was not dissolved in water, the water resistance was evaluated as C and when the composition was dissolved and dispersed, the water resistance was evaluated as D. When the water resistance is A or B, it is construed that the water glass composition has a practical water resistance.

Comparative phosphate samples C-1 to C-11 shown in Referential Example 7 were also added to the concentrated sodium silicate, and the foregoing physical properties of the resulting water glass compositions were similarly determined.

Results obtained are shown in Table 8.

Table 8

| Kind of curing Agent | Homogeneousness of Water Glass Composition (amount, %, of portion passing through Saran filter cloth) | Gelation Time (minutes) | Water Resistance after curing | |
|---|---|---|---|---|
| | | | 60° C×4 hours | 25° C×7 days |
| H-1 | 98 | 335 | A | A |
| H-2 | 98 | 200 | A | A |
| H-3 | 98 | 145 | A | B |
| H-4 | 98 | 270 | A | A |
| H-5 | 98 | 45 | B | B |
| H-6 | 98 | 320 | A | A |
| H-7 | 98 | 150 | A | A |
| H-8 | 98 | 270 | A | B |
| H-9 | 98 | 210 | A | B |
| H-10 | 98 | 250 | A | B |
| H-11 | 98 | 240 | A | B |
| H-12 | 98 | 170 | A | B |
| H-13 | 98 | 180 | A | A |
| H-14 | 98 | 190 | A | A |
| H-15 | 98 | 290 | A | A |
| H-16 | 98 | 305 | A | A |
| H-17 | 98 | 305 | A | A |
| H-18 | 98 | 290 | A | A |
| H-19 | 98 | 320 | A | A |
| H-20 | 98 | 330 | A | A |
| H-21 | 98 | 245 | A | B |
| H-22 | 98 | 260 | A | A |
| H-23 | 98 | 265 | A | A |
| H-24 | 98 | 170 | A | B |
| H-25 | 98 | 200 | A | A |
| H-26 | 98 | 190 | A | A |
| H-27 | 94 | 70 | B | B |
| H-28 | 98 | 245 | A | A |
| H-29 | 98 | 134 | A | B |
| H-30 | 98 | 320 | A | A |
| H-31 | 98 | 160 | A | A |
| H-32 | 98 | 320 | A | A |
| H-33 | 95 | 136 | A | A |
| H-34 | 98 | 313 | A | A |
| H-35 | 98 | 20 | B | B |
| H-36 | 93 | 30 | B | B |
| H-37 | 95 | 180 | A | B |
| H-38 | 96 | 240 | A | A |
| H-39 | 93 | 20 | B | B |
| H-40 | 96 | 30 | B | B |
| H-41 | 98 | 150 | A | A |
| H-42 | 98 | 150 | A | A |
| H-43 | 92 | 20 | B | B |
| H-44 | 96 | 70 | B | A |
| H-45 | 96 | 175 | A | A |
| H-46 | 98 | 250 | A | A |
| H-47 | 98 | 340 | A | A |
| H-48 | 98 | 360 | A | A |
| H-49 | 92 | 30 | B | B |
| H-50 | 92 | 130 | A | B |
| H-51 | 92 | 200 | A | B |
| H-52 | 92 | 40 | B | B |
| H-53 | 95 | 30 | B | B |
| H-54 | 98 | 300 | A | A |
| H-55 | 98 | 320 | A | A |
| H-56 | 98 | 320 | A | A |
| H-57 | 98 | 325 | A | A |
| H-58 | 98 | 320 | A | A |
| H-59 | 98 | 310 | A | B |
| H-60 | 94 | 180 | A | B |
| H-61 | 92 | 80 | B | B |
| H-62 | 92 | 70 | B | B |
| H-63 | 94 | 235 | A | A |
| H-64 | 96 | 235 | A | B |
| H-65 | 98 | 320 | A | A |
| H-66 | 98 | 320 | A | A |
| H-67 | 98 | 320 | A | A |
| H-68 | 98 | 330 | A | A |
| H-69 | 98 | 330 | A | A |
| H-70 | 98 | 310 | A | A |
| H-71 | 98 | 310 | A | A |
| H-72 | 98 | 320 | A | A |
| H-73 | 18 | 10 | C | C |
| H-74 | 12 | 10 | C | C |
| H-75 | 7 | 5 | C | C |
| H-76 | 19 | 20 | C | C |
| H-77 | 17 | 10 | C | C |
| H-78 | 10 | 5 | C | C |
| H-79 | 92 | 160 | A | B |
| H-80 | 92 | 120 | A | B |
| H-81 | 92 | 80 | B | B |
| H-82 | 98 | 290 | A | A |
| H-83 | 98 | 260 | A | A |
| H-84 | 98 | 250 | A | A |

Table 8-continued

| Kind of curing Agent | Homogeneousness of Water Glass Composition (amount, %, of portion passing through Saran filter cloth) | Gelation Time (minutes) | Water Resistance after curing 60° C×4 hours | 25° C×7 days |
|---|---|---|---|---|
| H-85 | 98 | 370 | A | A |
| H-86 | 98 | 370 | A | A |
| H-87 | 98 | 350 | A | A |
| H-88 | 98 | 380 | A | A |
| H-89 | 98 | 400 | A | A |
| C-1 | 18 | 4 | C | C |
| C-2 | 82 | 8 | C | C |
| C-3 | 78 | 27 | C | C |
| C-4 | — | not cured | — | — |
| C-5 | — | not cured | — | — |
| C-6 | 18 | 4 | C | C |
| C-7 | 12 | 5 | C | C |
| C-8 | 98 | 460 | C | D |
| C-9 | 98 | 420 | C | D |
| C-10 | 98 | 480 | C | D |
| C-11 | 15 | 5 | C | C |

From the results shown above, it will readily be understood that water glass compositions comprising a curing agent containing a soluble phosphoric acid component capable of being gradually released, namely a curing agent having an initial dissolution amount (B) of up to 200 mg and an average hydrolysis rate constant (A) of at least 0.2, maintain a stable sol state for a certain time, i.e., have a suitable pot life, without such troubles as partial gelation or insufficient dispersion even if concentrated sodium silicate is employed, and that they have a good water resistance after curing.

EXAMPLE 2

Various water glass compositions differing in the kind of the silicate binder are illustrated in this Example.

The following 6 alkali metal dilicates were chosen as the water-soluble or water-dispersible silicate binder; namely, sodium silicate ( $Na_2O$ concentration = 4.4 g/100 ml, $SiO_2$ concentration = 29.8 g/100 ml, $SiO_2/Na_2O$ mole ratio = 2.14 ), potassium silicate ( $K_2O$ concentration = 18.2 g/100 ml, $SiO_2$ concentration = 32.4 g/100 ml, $SiO_2/K_2O$ mole ratio = 3.00 ), lithium silicate ( $Li_2O$ concentration = 7.90 g/.100 ml, $SiO_2$ concentration = 46.7 g/100 ml, $SiO_2/Li_2O$ mole ratio = 2.94 ), diluted sodium silicate solution (A) ( $Na_2O$ concentration = 13.1 g/100 ml, $SiO_2$ concentration = 27.1 g/100 ml, $SiO_2/Na_2O$ mole ratio = 2.14 ), diluted sodium silicate solution (B) ( $Na_2O$ concentration = 6.35 g/100 ml, $SiO_2$ concentration = 18.2 g/100 ml, $SiO_2/Na_2O$ mole ratio = 2.96 ), and diluted potassium silicate solution ($K_2O$ concentration = 7.13 g/100 ml, $SiO_2$ concentration = 12.7 g/100 ml, $SiO_2/K_2O$ mole ratio = 3.00).

As the curing agent for these silicate binders, there were chosen samples H-1 and H-3 shown in Referential Example 1.

The curing agent was added at room temperature to the silicate binder in an amount of 50, 40 or 30 parts by weight per 100 parts by weight of the silicate binder as calculated as $SiO_2$, and the mixture was agitated for 2 minutes to obtain a water glass composition.

The homogeneousness, gelation time and water resistance after curing were determined with respect to each of the so obtained water glass compositions in the same manner as described in Example 1 to obtain results shown in Table 9.

From the results shown in Table 9, it will readily be understood that water glass compositions comprising a silicate binder and a curing agent composed mainly of a silicon polyphosphate or its alkali metal salt which satisfies the requirements of this invention are homogeneous and have a good water resistance after curing, and that in these compositions, the gelation time, namely the time during which the compositions retain a liquid state, can be controlled by adjustisng the concentration of the silicate binder.

Table 9

| Curing Agent | Silicate Binder | Amount (parts) of Curing Agent | Homogeneousness(%) | Gelation Time (minutes) | Water Resistance (60° C. × 4 hours) |
|---|---|---|---|---|---|
| H-1 | sodium silicate | 50 | 92 | 270 | A |
| | | 40 | 96 | 330 | A |
| | | 30 | 98 | 400 | A |
| | potassium silicate | 50 | 92 | 270 | A |
| | | 40 | 96 | 345 | A |
| | | 30 | 98 | 415 | A |
| | lithium silicate | 50 | 92 | 250 | A |
| | | 40 | 96 | 310 | A |
| | | 30 | 98 | 370 | A |
| | diluted sodium silicate solution(B) | 50 | 98 | 300 | A |
| | | 40 | 98 | 370 | A |
| | | 30 | 98 | 440 | A |
| | diluted potassium silicate solution | 50 | 98 | 400 | A |
| | | 40 | 98 | 490 | A |
| | | 30 | 98 | 610 | A |
| H-3 | sodium silicate | 50 | 92 | 120 | A |
| | | 40 | 96 | 140 | A |
| | | 30 | 98 | 170 | A |
| | potassium silicate | 50 | 92 | 120 | A |
| | | 40 | 96 | 155 | A |
| | | 30 | 98 | 180 | A |
| | lithium silicate | 50 | 92 | 100 | A |
| | | 40 | 96 | 120 | A |
| | | 30 | 98 | 145 | A |
| H-3 | diluted sodium silicate solution(B) | 50 | 98 | 245 | A |
| | | 40 | 98 | 240 | A |
| | | 30 | 98 | 300 | A |
| | diluted potassium silicate solution | 50 | 98 | 200 | A |
| | | 40 | 98 | 250 | A |
| | | 30 | 98 | 300 | A |

EXAMPLE 3

Water glass compositions into which various fillers are incorporated are illustrated in this Example.

As the substrate water glass composition, there was chosen a water glass composition shown in Example 1, which comprises 100 parts by weight of concentrated sodium silicate and 15 parts by eight of the curing agent sample H-1 composed mainly of a sodium polyphosphate.

As the filler, the following 16 commercially available products were chosen; namely, rock wool, glass fiber, asbestos, talc, zinc flower, titanium oxide, red iron oxide, magnesium carbonate, alumina powder, finely divided silica, acid clay, mica powder, carbon black, calcium silicate and diatomaceous earth.

The fillers were incorporated in amounts indicated in Table 10 ( parts by weight per 100 parts by weight of the concentrated sodium silicate ) to form filler-incorporated water glass compositions.

In the same manner as described in Example 1, the homogeneousness, the gelation time and the water resistance after curing were determined with respect to each of the so obtained water glass compositions to obtain results shown in Table 10. When fillers incapable of passing through a 100-mesh Saran filter cloth were incorporated, the homogeneousness was evaluated based on the flowability of the composition.

From the results shown in Table 10, it will readily be understood that water glass compositions of this invention have good properties even when various fillers are incorporated.

4-B: Compositions for Bonding Steel, Wood or Glass Plate to Slate Plate:

Steel, wood, glass and slate plates having a size of 3.0 cm × 2.5 cm × 0.5 cm were prepared. The water glass composition sample 10-5 prepared in Example 3 was coated in a thickness of about 2 mm on the surface of the slate plate of a rectangular form (3.0 cm × 2.5 cm) over an area of 2.5 cm × 2.5 cm while leaving one side portion ( 0.5 cm × 2.5 cm ) uncoated. Then, an area of Table 10

| Water Glass Composition Sample No. | Fillers | Amounts (parts) of Fillers | Homogeneousness (%) | Gelation Time (minutes) | Water Resistance (60° C. × 4 hours) |
|---|---|---|---|---|---|
| 10-1 | rock wool<br>zinc flower<br>calcium silicate | 20<br>10<br>10 | good | 280 | A |
| 10-2 | glass fibers<br>titanium oxide<br>magnesium carbonate | 20<br>10<br>10 | good | 300 | A |
| 10-3 | asbestos<br>alumina powder<br>talc | 20<br>10<br>10 | good | 320 | A |
| 10-4 | glass fiber<br>finely divided silica<br>mica | 20<br>15<br>10 | good | 340 | A |
| 10-5 | asbestos<br>red iron oxide<br>calcium silicate | 20<br>15<br>15 | good | 310 | A |
| 10-6 | diatomaceous earth<br>carbon black<br>acid clay | 20<br>10<br>10 | good | 350 | A |
| 10-7 | diatomaceous earth<br>zinc flower<br>acid clay | 20<br>10<br>10 | good | 340 | A |
| 10-8 | titanium oxide<br>zinc flower<br>finely divided silica | 15<br>15<br>15 | 98 | 330 | A |
| 10-9 | red iron oxide<br>calcium silicate<br>zinc flower | 20<br>15<br>10 | 98 | 310 | A |

EXAMPLE 4

This Example illustrates results obtained when water glass compositions of this invention were applied to practical uses.

4-A: Compositions for Coating of Slate Plates:

A slate plate having a size of 30 cm × 25 cm × 0.5 cm was sufficiently dried at 200° C. for 1 hour, and the water glass composition sample 10-1 or 10-9 was coated on the entire surface in a thickness of about 2 mm. The coated slate plate was allowed to stand still at room temperature ( 20° to 30° C. ) for 10 days to effect curing. Then, the plate was thrown into water maintained at 25° C. and after passage of 24 hours, the plate was taken out from water. The water absorbed in the slate plate was measured and compared with the amount of water absorbed in a non-coated comparative slate plate. It was found that although the non-coated plate absorbed 20.1% of water, the plate coated with the water glass composition sample 10-1 absorbed only 1.5% of water and the plate coated with the water glass composition sample 10-9 absorbed 2.6% of water.

From the foregoing results, it will readily be understood that coatings formed by using water glass compositions of this invention have not only a good water resistance but also a much reduced water permeability, and that water glass compositions of this invention impart a good water resistance and a good water-insulating property to coated articles. Accordingly, it is apparent that water glass compositions of this invention can be effectively used as paints, coating-forming agents and coating agents.

2.5 cm × 2.5 cm of the steel, wood or glass plate was bonded to the coated portion of the slate plate so that non-bonded portions of both the plates were projected in opposite directions in an ear-like form and the bonded structure was allowed to stand still at room temperature ( 20° to 30° C. ) for 10 days or at 60° C. for 4 hours to effect curing and thrown into water maintained at 25° C. After passage of 24 hours, the compression bonding strength of the bonded interface was determined according to the method of JIS K-6852. It was found that the compression bonding strength was 12 Kg/cm$^2$ in the case of the steel-slate bonded structure, 22 Kg/cm$^2$ in the case of the wood-slate bonded structure and 18 Kg/cm$^2$ in the case of the glass-slate bonded structure. In short, it was confirmed that even after dipping in water for 24 hours, the bonding strength attained by the water glass composition was comparable to the bonding strength attained by an ordinary organic adhesive. Thus, it will readily be understood that the water glass composition of this invention can be used instead of organic adhesives as an inorganic adhesive having an improved water resistance and being capable of providing characteristics not given by organic adhesives, namely good heat resistance and flame retardancy.

EXAMPLE 5

This Example illustrates water glass compositions having an improved adhesive property.

As the water-soluble or water-dispersible silicate binder, there was chosen a commercially available sodium silicate, water glass No. 3 specified by JIS, having a silicic acid concentration 37.0 g/100 ml as $SiO_2$ and an alkali concentration of 12.9 g/100 ml as $Na_2O$.

As the curing agent for thise silicate binder, there were chosen curing agents H-1, H-2 and H-3 prepared in Referential Example 1, and comparative curing agent C-5 prepared in Referential Example 7.

As the finely divided metal oxide to be used as the anchoring agent, there was chosen finely divided iron oxide ( red iron oxide, $Fe_2O_3$ ) formed by adjusting the particle size of a commercially available product, red iron oxide No. 1 specified by JIS K-5109, below 0.3 $\mu$ by water sieve.

As the polyvalent metal silicate, there was chosen magnesium silicate prepared by mixing the dealkalized silica gel III prepared in Referential Example 1 as the silicic acid component with commercially available basic magnesium carbonate as the starting magnesium component so that the mixing mole ratio of both the starting components, expressed as $MgO/SiO_2$, was 1/1, adding a small amount of water to the mixture, drying the resulting paste to obtain a mixture of small agglomerates, calcining the mixture at 1000° C. for 2 hours, and pulverizing and sieving the calcined product to obtain powdery magnesium silicate capable of passing through a 200-mesh sieve.

First, 20 parts by weight of commercially available asbestos was dispersed uniformly in 100 parts by weight of the above-mentioned concentrated sodium silicate. Then, 15 parts by weight of the above-mentioned curing agent, 20 parts by weight of the finely divided red iron oxide and 20 parts by eight of the powdery magnesium silicate were added to the mixture. The resulting mixture was agitated for about 5 minutes. In this manner, four water glass compositions ( samples S-1 to S-4 ) were prepared.

The bonding strength of each of the so formed compositions was tested in the following manner according to the method of JIS K-6852, described in Example 4.

As comparative compositions, there was chosen a water glass composition ( SC-1 ) comprising 100 parts by weight of the concentrated sodium silicate, 20 parts by weight of asbestos and 15 parts by weight of the curing agent sample H-1, a water glass composition ( SC-2 ) comprising 100 parts by weight of the concentrated sodium silicate, 20 parts by weight of asbestos, 20 parts by weight of red iron oxide and 15 parts of the curing agent sample H-2, a water glass composition ( SC-3 ) comprising 100 parts by weight of the concentrated sodium silicate, 20 parts by eight of asbestos, 20 parts by weight of magnesium silicate and 15 parts by weight of the curing agent sample H-3 and a water glass composition comprising 100 parts by weight of the concentrated sodium silicate, 20 parts by weight of asbestos, 20 parts by weight of calcium carbonate and 15 parts by weight of the curing agent sample C-5 Steel plates and asbestos plates were bonded by using these water glass compositions in the same manner as described above, and the compression bonding strength was determined in the same manner as described above.

Results of the measurement are shown in Table 11.

From the results shown in Table 11, it will readily be understood that when finely divided red iron oxide and powdery magnesium silicate are incorporated into a water glass composition of this invention, solids are intimately filled and dispersed in the composition to prevent shrinkage of the composition at the step of curing and the adhesion to the substrate is improved by the anchoring activity of the red iron oxide, whereby the adhesive characteristics of the water glass composition can be highly improved.

Table 11

| Water Glass Composition Sample No. | Curing Agent Sample No. | Bonding Strength (Kg/cm²) after Water Dipping | |
|---|---|---|---|
| | | cured at room temperature for 10 days | cured at 60° C. for 4 hours |
| S-1 | H-1 | 44 | 46 |
| S-2 | H-2 | 36 | 38 |
| S-3 | H-3 | 12 | 13 |
| S-4 | C-5 | 1.0 | 0.5 |
| SC-1 | H-1 | 3.0 | 2.0 |
| SC-2 | H-2 | 2.5 | 2.0 |
| SC-3 | H-3 | 2.0 | 2.0 |
| SC-4 | C-5 | 0 | 0 |

EXAMPLE 6

Water glass compositions comprising various inorganic substances as the anchoring agent are illustrated in this Example.

The same commercially available sodium silicate, water glass No. 3 specified by JIS, as used in Example 5 was chosen as the water-soluble or water-dispersible silicate binder.

The curing agent sample H-1 prepared in Referential Example 1 was chosen as the curing agent for the silicate binder.

The powdery magnesium silicate prepared in Example 5 was chosen as the polyvalent metal silicate of the filler.

The following 19 substances were chosen as the inorganic anchoring agent; namely, 10 kinds of commercially available polishing agents, i.e., iron oxide ( red iron oxide ), chromium oxide, α-alumina, quartz powder, zircon sand ( zirconium silicate ), silicon carbide, titanium carbide, boron carbide and boron nitride, 4 kinds of commercially available pigments, i.e., titanium oxide ( rutile type ), zinc oxide ( zinc flower ), lead oxide ( ligharge ) and iron oxide ( black iron oxide ), and 5 kinds of naturally occurring minerals, i.e., ilmenite ( $FeO.TiO_2$ ) powder, sand iron powder, phosphate rock powder, garnet powder and silica sand ( produced in Australia ) powder. The particle size of each anchoring agent was adjusted below 0.5 $\mu$ by water sieving, and it was used after drying.

First, 20 parts by weight of commercially available asbestos was sufficiently dispersed in 100 parts by weight of the concentrated sodium silicate solution. Then, 15 parts by weight of the curing agent sample H-1, 15 parts by weight of the magnesium silicate powder and 15 parts by weight of the anchoring agent were added to the mixture. The resulting mixture was agitated for about 5 minutes. In this manner, 19 kinds of water glass compositions ( samples S-5 to S-23 ) were prepared.

In the same manner as described in Example 4, steel and asbestos plates were bonded by using these water glass composition, and curing was conducted to obtain results shown in Table 12.

From the results shown in Table 12, it will readily be understood that when finely divided products of various polishing agents, pigments and naturally occurring minerals are incorporated in water glass compositions of this invention, bonded structures formed by using these water glass compositions have a very high bonding strength even after immersion in water and the compositions have very good adhesive characteristics to various materials.

Table 12

| Water Glass Composition Sample No. | Kind of Anchoring Agent | Bonding Strength (Kg/cm²) after Water Immersion | |
|---|---|---|---|
| | | cured at room temperature for 10 days | cured at 60° C. for 4 hours |
| S-5 | red iron oxide | 45 | 47 |
| S-6 | chromium oxide | 40 | 42 |
| S-7 | α-alumina | 44 | 46 |
| S-8 | quartz powder | 40 | 42 |
| S-9 | zircon sand | 40 | 42 |
| S-10 | silicon carbide | 46 | 49 |
| S-11 | titanium carbide | 45 | 47 |
| S-12 | boron carbide | 44 | 48 |
| S-13 | boron nitride | 43 | 48 |
| S-14 | titanium nitride | 42 | 45 |
| S-15 | titanium oxide | 12 | 13 |
| S-16 | zinc oxide | 12 | 13 |
| S-17 | lead oxide | 18 | 20 |
| S-18 | black iron oxide | 33 | 35 |
| S-19 | ilmenite | 30 | 32 |
| S-20 | sand iron | 28 | 30 |
| S-21 | phosphate rock | 8 | 10 |
| S-22 | garnet | 38 | 40 |
| S-23 | silica sand powder | 36 | 38 |

The water glass composition S-5, S-7, S-8 or S-15 was dip-coated at 25° C. to a commerically available gypusm board having a size of 30 cm × 30 cm × 0.7 xm to form a coating having a thickness of about 0.5 mm on the surface of the gypsum board. This coated board and a comparative uncoated board were allowed to stand still at room temperature in air for 10 days, and then, they were immersed in water maintained at room temperature and allowed to stand still in this state for 1 hour. The coated board did not break out either in water or after it had been taken out of water. In contrast, the uncoated board broke out while it was immersed in water.

EXAMPLE 7

Water glass compositions comprising various silicates as the polyvalent metal silicate of the filler are illustrated in this Example.

As the water-soluble or water-dispersible silicate binder, there was employed the same sodium silicate as used in Example 5, namely water glass No. 3 specified by JIS.

The curing agent sample H-1 prepared in Referential Example 1 was used as the curing agent for this silicate binder.

As the inorganic, finely divided anchoring agent, there was used the same red iron oxide of a particle size adjusted below 0.5 μ as used in Example 5.

As the polyvalent metal silicate, there were chosen 24 finely divided polyvalent metal silicates prepared in the manners described below, and 26 polyvalent metal silicates naturally occurring or obtained as by-products.

Sodium silicate was mixed with calcium carbonate or magnesium chloride at a mole ratio of SiO₂ - CaO or MgO of 1 : 1 and the mixture was heated at 80° C. under agitation for 2 hours in an aqueous solution to cause double decomposition. The sodium salt was removed by water washing and the reaction product was dried at 120° C., and pulverized. In this manner, the two polyvalent metal silicates (F-1 and F-2) were obtained.

The dealkalized silica gel III used in Referential Example 1 as the starting silicic acid component was mixed with a polyvalent metal salt selected from commercially available zinc flower (ZnO), magnesium carbonate (MgCO₃), quick lime (CaO), barium hydroxide [Ba(OH)₂. 8H₂O], strontium nitrate [Sr(NO₃)₂·4H₂O], red iron oxide (Fe₂O₃), litharge (PbO), stannic oxide (SnO₂), zirconium oxychloride (ZrOCl₂·8H₂O) and aluminum hydroxide [Al(OH)₃·nH₂O] so that the mole ratio of the silicic acid component and the polyvalent metal component, expressed as $PO_{k/2}/SiO_2$ (in which R stands for a polyvalent metal and $k$ is the valency of the metal R), was within a range of 0.5 to 4 as indicated in Table 13. Water was added to the mixture and the resulting paste was dried to obtain a mixture of small agglomerates. Then, the mixture was calcined at 1000° C. for 1 hour, and the calcined product was pulverized and sieved to obtain a finely divided polyvalent metal silicate passable through a 200-mesh sieve. Thus, there were obtained 22 kinds of polyvalent metal silicates (samples F-3 to F-24). As the naturally occurring polyvalent metal silicate, there were chosen kaoline, acid clay, mica, talc, diatomaceous earth and zicron sand. As the synthetic polyvalent metal silicate or the polyvalent metal silicate obtained as a by-product, there were chosen activated clay, blast furnace slag, sand iron slag, fly ash, Portland cement, calcium silicate and zeolite. These naturally occurring polyvalent metal silicate, synthetic polyvalent metal silicates and polyvalent metal silicates obtained as by-products were dried at 300° C. for 24 hours or calcined at 1000° C. for 2 hours, pulverized and passed through a 200-mesh sieve to obtain 26 finely divided polyvalent metal silicates (samples F-25 to F-50).

First, 20 parts by weight of commercially available asbestos was sufficiently dispersed in 100 parts by weight of the concentrated sodium silicate solution. Then, 15 parts by weight of the curing agent H-1 prepared in Referential Example 1, 20 parts by weight of iron oxide as the anchoring agent and 20 parts by weight of the above-mentioned polyvalent metal silicate was added to the mixture. The resulting mixture was agitated for about 5 minutes. In this manner, 50 water glass compositions (samples S-24 to S-73) were prepared.

In the same manner as described in Example 4, steel and asbestos plates were bonded by using these 50 water glass compositions to obtain results shown in Table 13.

From the results shownin Table 13, it will readily be understood that when various polyvalent metal silicates can be used effectively as fillers for water glass compositions of this invention in combination with red iron oxide as the anchoring agent and that polyvalent metal silicates heat-treated at higher temperatures give better results as regards the bonding strength. It will also readily be understood that when a combination of a polyvalent metal silicate with red iron oxide is incorporated as a filler into the water glass composition of this invention, the bonding strength of the composition can be highly improved.

Table 13

| Water Glass Composition Sample No. | Polyvalent Metal Silicate Sample No. | Starting Material of Polyvalent Metal Silicate | $RO_{n/2}/SiO_2$ Mole Ratio in Polyvalent Metal Silicate | Heat Treatment Temperature(° C) | Bonding Strength (Kg/cm$^2$) after Water Immersion |
|---|---|---|---|---|---|
| S-24 | F-1 | calcium carbonate | 1 | 120 | 25 |
| S-25 | F-2 | magnesium chloride | 1 | 120 | 40 |
| S-26 | F-3 | zinc flower | 0.5 | 1000 | 30 |
| S-27 | F-4 | " | 1 | 1000 | 36 |
| S-28 | F-5 | " | 3 | 1000 | 28 |
| S-29 | F-6 | " | 4 | 1000 | 25 |
| S-30 | F-7 | magnesium carbonate | 0.5 | 1000 | 45 |
| S-31 | F-8 | " | 1 | 1000 | 46 |
| S-32 | F-9 | " | 2 | 1000 | 43 |
| S-33 | F-10 | " | 3 | 1000 | 38 |
| S-34 | F-11 | " | 4 | 1000 | 32 |
| S-35 | F-12 | quick lime | 1 | 1000 | 28 |
| S-36 | F-13 | barium hydroxide | 1 | 1000 | 29 |
| S-37 | F-14 | barium hydroxide | 2 | 1000 | 35 |
| S-38 | F-15 | strontium nitrate | 1 | 1000 | 35 |
| S-39 | F-16 | " | 2 | 1000 | 39 |
| S-40 | F-17 | red iron oxide | 1 | 1000 | 48 |
| S-41 | F-18 | " | 2 | 1000 | 48 |
| S-42 | F-19 | litharge | 0.5 | 1000 | 24 |
| S-43 | F-20 | " | 1 | 1000 | 28 |
| S-44 | F-21 | stannic oxide | 1 | 1000 | 29 |
| S-45 | F-22 | " | 2 | 1000 | 33 |
| S-46 | F-23 | aluminum hydroxide | 1 | 1000 | 22 |
| S-47 | F-24 | zirconium oxychloride | 1 | 1000 | 36 |
| S-48 | F-25 | kaoline | — | 300 | 14 |
| S-49 | F-26 | " | — | 1000 | 20 |
| S-50 | F-27 | acid clay | — | 300 | 12 |
| S-51 | F-28 | " | — | 1000 | 18 |
| S-52 | F-29 | mica | — | 300 | 15 |
| S-53 | F-30 | " | — | 1000 | 22 |
| S-54 | F-31 | talc | — | 300 | 25 |
| S-55 | F-32 | " | — | 1000 | 37 |
| S-56 | F-33 | diatomaceous earth | — | 300 | 19 |
| S-57 | F-34 | " | — | 1000 | 24 |
| S-58 | F-35 | zircon sand | — | 300 | 28 |
| S-59 | F-36 | " | — | 1000 | 38 |
| S-60 | F-37 | activated clay | — | 300 | 34 |
| S-61 | F-38 | " | — | 1000 | 40 |
| S-62 | F-39 | blast furnace slag | — | 300 | 14 |
| S-63 | F-40 | blast furnace slag | — | 1000 | 18 |
| S-64 | F-41 | sand iron slag | — | 300 | 17 |
| S-65 | F-42 | " | — | 1000 | 21 |
| S-66 | F-43 | fly ash | — | 300 | 13 |
| S-67 | F-44 | " | — | 1000 | 14 |
| S-68 | F-45 | portland cement | — | 300 | 24 |
| S-69 | F-46 | " | — | 1000 | 25 |
| S-70 | F-47 | calcium silicate | — | 300 | 26 |
| S-71 | F-48 | " | — | 1000 | 28 |
| S-72 | F-49 | zeolite | — | 300 | 24 |
| S-73 | F-50 | " | — | 1000 | 28 |

EXAMPLE 8

This example illustrates various kinds of water glass compositions differing in the mixing ratio of the components.

The same silicate binder as used in Example 5 was employed, and the curing agent, anchoring agent, polyvalent metal silicate and other filler or pigment shown in Table 14 were incorporated in amounts indicated in Table 14. Each amount is expressed in terms of parts by weight per 100 parts by weight of the silicate binder solution. In this manner, 6 water glass compositions samples (S-74 to S-79) were prepared.

In the same manner as described in Example 4, steel and asbestos plates were bonded by using these water glass compositions to obtain results shown in Table 14.

From the results shown in Table 14, it will readily be understood that when water glass compositions comprising a curing agent for the inorganic silicate binder, a finely divided inorganic anchoring agent and a finely divided polyvalent metal silicate are cured, the anchoring agent and the polyvalent metal silicate are intimately filled in the silicate binder as gravel and sand are intimately filled in cement when the cement is concreted, whereby the shrinkage by inner stress at the curing step is interfered in, and a strong bonding force can be attained with the anchoring effect of the inorganic anchoring agent and a high water resistance is simultaneously maintained.

Table 14

| Water Glass Composition Sample No. | Components in Water glass Composition | Amounts (parts by weight) | Bonding Strength (Kg/cm$^2$) after Water Immersion |
|---|---|---|---|
| S-74 | curing agent H-1 | 15 | |
| | red iron oxide | 20 | |
| | polyvalent metal silicate F-8 | 60 | 48 |
| | asbestos | 20 | |
| S-75 | curing agent H-1 | 15 | |
| | red iron oxide | 60 | |
| | polyvalent metal silicate F-4 | 80 | 42 |
| | glass fiber | 10 | |
| | asbestos | 10 | |
| S-76 | curing agent H-1 | 15 | |
| | silicon carbide | 20 | |
| | polyvalent metal silicate F-17 | 20 | 40 |
| | asbestos | 20 | |
| S-77 | curing agent H-1 | 15 | |
| | α-alumina | 25 | |
| | polyvalent metal silicate F-8 | 30 | 35 |
| | mica powder | 20 | |
| | titanium oxide | 5 | |
| | curing agent H-1 | 15 | |

Table 14-continued

| Water Glass Composition Sample No. | Components in Water glass Composition | Amounts (parts by weight) | Bonding Strength (Kg/cm²) after Water Immersion |
|---|---|---|---|
| S-78 | red iron oxide | 10 | 32 |
|  | polyvalent metal silicate F-17 | 50 |  |
|  | mica powder | 20 |  |
|  | diamaceous earth | 20 |  |
|  | curing agent H-2 | 25 |  |
| S-79 | red iron oxide | 30 | 38 |
|  | polyvalent metal silicate F-38 | 30 |  |
|  | asbestos | 20 |  |
|  | magnesium carbonate | 10 |  |

EXAMPLE 9

This example illustrates water glass compositions comprising a silicate binder particularly synthesized.

As such silicate binder, there were chosen two products A and B prepared from Japanese acid clay and sand iron slug, respectively.

In case the acid clay was used as the starting material, the silicate binder A was prepared according to the method idsclosed in Japanese Patent Publication No. 2277/45. Acid clay produced at Niigata prefecture, Japan (having an oxide composition of 78.7% of $SiO_2$, 13.1% of $Al_2O_3$, 0.57% of $Fe_2O_3$, 3.50% of MgO and 1.13% of CaO and having an ignition loss of 3.15%) was charged in an amount of 76.5 g on the dry base into a 500-ml capcity flask, and 200 ml of aqueous sulfuric acid having a concentration of about 50% by weight was added thereto. Then, the mixture was heated at 90° C. for 10 hours to effect acid treatment. According to the decantation method, the resulting basic salt was washed with aqueous sulfuric acid and then with water until no sulfuric acid ions were detected in the washing liquor. The resulting acid-treated acid clay containing esily reactive silicic acid was dispersed in water so that the concentration of the silicic acid component as $SiO_2$ was 30%. Then, solid sodium hydroxide (NaOH) was added to the dispersion so that the $SiO_2/Na_2O$ mole ratio was 3.5. The mixture was agitated at about 80° C. for 3 hours, to obtain an opaque homogeneous liquid silicate binder A having a dehydrated gel proportion FG of 100%, though the value FG of the commercially available sodium silicate used in Example 1 was 0%.

In case sand iron slag was used as the starting material, the silicate binder was prepared according to the method disclosed in Japanese Patent Publication No. 33526/70. Sand iron slag (having an oxide composition of 25.4% of $SiO_2$, 30.8% of $TiO_2$, 20.8% of CaO, 3.36% of FeO, 10.9% of $Al_2O_3$ and 9.92% of MgO) was pulverized to particles passable through a 200-mesh sieve. Then, 600 g of the pulverized slag was incorporated in sulfuric acid having a concentration of 20 g/100 ml, and the mixture was agitated to effect reaction. The gypsum formed as by-product by the reaction and the residue were removed by filtration, and the residual filtrate (containing 3.78 g/100 ml of free sulfuric acid, $H_2SO_4$, 5.26 g/100 ml of $TiO_2$ and 4.39 g/100 ml of $SiO_2$) was mixed with free sulfuric acid so that the concentration of free sulfuric acid was 5.0 g/100 ml. The liquid was cast in a vat in a thickness of 2.0 mm and heated in a drier maintained at 110° C. to thereby concentrate and gel the silica component without hydrolysis of the titanium and other basic components.

Then, the basic components were removed by extraction in an aqueous solution of sulfuric acid of a concentration of 20 g/100 ml, and sulfuric acid ions were washed away with water. The so obtained easily reactive silicic acid gel was dispersed in water so that the concention as $SiO_2$ was 30%, and solid sodium hydroxide (NaOH) was added to the dispersion in such an amount that the $SiO_2/Na_2O$ mole ratio was 3.6. The mixture was heated and agitated for about 3 hours at about 80° C. to obtain a silicate binder B as a slightly opaque homogenous liquid having a FG value of 100%.

As the curing agent for these silicate binders A and B, the curing agent samples H-1 and H-3 were chosen. The curing agent was added in an amount of 15 parts by weight per 100 parts by weight of the silicate binder, and the mixture was agitated for 2 minutes at room temperature to obtain a water glass composition.

With respect to each of the so obtained water glass compositions, the homogeneousness, gelation time and water resistance after curing were determined to obtain results shown in Table 15.

Table 15

| Synthetic Silicate Binder | Curing Agent | Homogeneousness(%) | Gelation Time (minutes) | Water Resistance |
|---|---|---|---|---|
| A | H-1 | 97 | 350 | A |
| A | H-3 | 96 | 180 | A |
| B | H-1 | 98 | 360 | A |
| B | H-3 | 98 | 200 | A |

Casting molds were prepared by using the so obtained water glass compositions in the following manner.

10 parts by weight of the water glass composition was added to 100 parts by weight of river sand containing 3% of water, the particle size distribution of which was as follows:

above 0.6 mm mesh-size: 13.8%
0.6 — 0.3 mm mesh-size: 82.2%
below 0.3 mm-mesh: 4.0%

Simultaneously with addition of the water glass composition, 0.2 part by weight of a surface active agent was added. The mixture was sufficiently blended, filled in a wood mold for formation of a casting mold and allowed to stand still in air for 24 hours. The strength of the resulting mold was measured. It was found that each casting mold had a strength higher than 25.5 Kg/cm².

From the foregoing results, it will readily be found that a water glass composition comprising a specific silicate binder synthesized from an easily reactive silicate component and an alkali metal component and a curing agent composed of a silicon polyphosphate or its alkali metal salt provides a solid product having a much better water resistance than a cured product of a commercially available water glass formed by autoclave extraction of cullets formed by melting silica sand by soda ash, and that when this water glass composition is used for preparing a casting mold together with river sand, a good casting mold excellent in the strength can be obtained with ease.

What we claim is:

1. A water glass composition comprising a water-soluble or water-dispersible silicate binder and an inorganic phosphate curing agent, wherein said inorganic phosphate curing agent is composed of an inorganic solid fine powder comprising as the main ingredient a silicon poylphosphate or its metal salt and said curing agent has an initial dissolution amount (B) of up to 200 mg and an average hydrolysis rate constant (A) of at least 0.2, said initial dissolution amount (B) and average hydrolysis rate constant (A) being defined by the following formula:

$$Y = AX + B$$

wherein $X$ stands for the lapse of time (minutes) of up to 120 minutes after 1 g of the curing agent has been added to 100 ml of a 4N sodium hydroxide aqueous solution, and $Y$ stands for the integrated amount (mg/100 ml) of phosphoric acid dissolved out of the curing agent into said aqueous solution during the time $X$.

2. The water glass composition as set forth in claim 1 wherein the curing agent is a powdery pigment having an oxide composition represented by the following formula:

$$SiO_2 \cdot xMO_{n/2} \cdot 0.1-0.7 P_2O_5$$

wherein M stands for an alkali metal, an alkaline earth metal, aluminum or zinc, $n$ is the valency of the metal M, and $x$ is a number of up to 0.2.

3. The water glass composition as set forth in claim 1 wherein the initial dissolution amount (B) is up to 100 mg and the average hydrolysis rate constant (A) is within a range of from 0.3 to 1.2.

4. The water glass composition as set forth in claim 1 wherein the curing agent is an inorganic solid fine powder composed mainly of an alkali metal salt of a silicon polyphosphate having a phosphoric acid component, an alkali metal component and a silicic acid component, the amount of the phosphoric acid component, as calculated as the oxide $P_2O_5$, in the curing agent is 0.1 to 0.7 mole per mole of the silicic acid component as calculated as the oxide $SiO_2$, and the amount of the alkali metal component, as calculated as the oxide $M_2O$ in which M stands for an alkali metal, in the curing agent is up to 20% by weight, based on the silicic acid component as calculated as the oxide $SiO_2$.

5. The water glass composition as set forth in claim 4 wherein the curing agent is a product obtained by (a) calcining a composition comprising the silicic acid component, the phosphoric acid component and the alkali metal component at said ratio at a temperature ranging from 400° to 1,000° C to form a clinker of an alkali metal salt of the silicon phosphate and (b) pulverizing the resulting clinker to particles having an average particle size smaller than 100 μ and re-calcining the pulverized product at a temperature of 400° to 1,000° C but not lower than the temperature adopted at the step (a).

6. The water glass composition as set forth in claim 4 wherein the alkali metal component of said curing agent is sodium.

7. The water glass composition as set forth in claim 1 wherein the silicate binder has an oxide composition represented by the following formula:

$$M^2_2O \cdot kSiO_2$$

wherein $M^2$ stands for an alkali metal and $k$ is a number of from 1 to 5.

8. The water glass composition as set forth in claim 7 wherein the silicate binder is an alkali silicate aqueous solution in which the mole ratio of the oxide of the silicic acid component to the oxide of the alkali metal component is from 3.50 to 3.75 and has a dehydrated gel proportion FG. (%) defined by the following formula:

$$FG = \frac{C_o - C}{C_o} \times 100$$

wherein $C_o$ stands for a dry weight (g) of solids obtained by dispersing 1.00 g of the alkali silicate binder of $SiO_2$ concentration of 25 to 30% in 150 ml of kerosine in a mixer under a high speed generation of at least 100 rpm, adding thereto 50 ml of methanol, and recovering resulting precipitates by filtration and drying them, and C designates a dry weight (g) of a portion of said dry precipitates passable through a 3-mesh sieve (Tyler sieve), is at least 50%.

9. The water glass composition as set forth in claim 1 wherein the silicate binder is an aqueous solution or dispersion having a binder concentration of 5 to 50% calculated as $SiO_2$.

10. The water glass composition as set forth in claim 1 wherein the curing agent is incorporated in an amount, as $P_2O_5$, of 10 to 150% by weight, based on the silicate binder as $SiO_2$.

11. A self-curable composition consisting of (i) a silicate binder composed of an aqueous solution or dispersion of an alkali metal silicate having an oxide composition represented by the following formula:

$$M^2_2O \cdot kSiO_2$$

wherein $M^2$ stands for an alkali metal and $k$ is a number from 2 to 4, and having an concentration of 5 to 50% by weight as calculated as $SiO_2$, (ii) a curing agent composed of an inorganic solid fine powder comprising as the main ingredient a silicon polyphosphate or its metal salt composed of a phosphoric acid component and a silicic acid component and said curing agent having an initial dissolution amount (B) of up to 200 mg and an average hydrolysis rate constant (A) of at least 0.2, said initial dissolution amount (B) and average hydrolysis rate constant (A) being defined by the following formula:

$$Y = AX + B$$

wherein $X$ stands for the lapse of time (minutes) of up to 120 minutes after 1 g of the curing agent has been added to 100 ml of a 4N sodium hydroxide aqueous solution, and $Y$ stands for the integrated amount 100 ml) of phosphoric acid dissolved out of the curing agent into said aqueous solution during the time $X$, the amount of the phophoric acid component as calculated as the oxide $P_2O_5$, in the curing agent being 0.1 to 0.7 mole per mole of the silicic acid component as calculated as the oxide $SiO_2$, and the amount of the alkali metal component, as calculated as the oxide $M_2O$ in which M stands for an alkali metal, in the curing agent being 2 to 10% by weight based on the silicic acid component as calculated as the oxide $SiO_2$, and the amount of the curing agent being 10 to 150% by weight based on the silicate binder as $SiO_2$, and (iii) 10 to 800% by weight, based on the silicate binder as $SiO_2$, of an additive selected from fibrous and particulate reinforcers, fillers and pigments.

12. The self-curable composition as set forth in claim 11 wherein the additive (iii) is a combination of (a) an inorganic anchoring agent in which particles having a size larger than 1 $\mu$ occupy less than 10% of the total particles and particles having a size smaller than 0.5 $\mu$ occupy more than 50% of the total particles and (b) of polyvalent metal silicate in which particles having a size larger than 80 $\mu$ occupy less than 10% of the total particles and particles having a size smaller than 20 $\mu$ occupy more than 50% of the total particles, the amount of the anchoring agent (a) being 10 to 300% by weight based on the silicate binder as $SiO_2$ and the amount of the polyvalent metal silicate (b) being 5 to 500% by weight based on the silicate binder as $SiO_2$.

13. The water glass composition as set forth in claim 4 wherein the amount of the alkali metal component, calculated as the oxide, $M_2O$, in the curing agent is 2 to 10% by weight, based on the silicic acid component, calculated as oxide $SiO_2$.

14. The water glass composition of claim 7 wherein $k$ is a number from 2 to 4.

15. The water glass composition of claim 8 wherein the dehydrated gel proportion, FG (%) is at least 80%.

16. The water glass composition of claim 10 wherein the curing agent is incorporated in an amount, as $P_2O_5$, of 30 to 100% by weight, based on the silicate binder as $SiO_2$.

17. The water glass composition of claim 2 wherein said pigment is at least one silicon phosphate selected from the groups consisting of $2SiO_2 \cdot P_2O_5$, $3SiO_2 \cdot 2P_2O_5$ and $SiO_2 \cdot P_2O_5$ or a metal salt of these silicon phosphates or a mixture or complex of the silicon phosphates or their metal salts with anhydrous silicic acid, silicate or phosphate.

18. The self-curable composition of claim 11 wherein the additive (iii) is a member selected from the group consisting of glass fiber, rock wool, slag wool, asbestos, carbon fiber, metal fiber, carbon black, glass powder, white carbon, silica powder, kaoline, calcinated clay, acid clay, activated clay, titanium dioxide, zirconium dioxide, alumina powder, barium sulfate, magnesium carbonate, calcium carbonate, zinc oxide, gypsum, sand, titanium oxide, chrome yellow, red iron oxide, ultramarine chrome green and mars violet.

19. The self-curable composition of claim 12 wherein said inorganic anchoring agent (a) is iron (III) oxide, iron (II) oxide or triiron tetraoxide and said polyvalent metal silicate (b) is a silicate of a metal selected from the group consisting of magnesium, calcium, barium, zinc, aluminum, iron, lead and chromium.

20. Th self-curable composition of claim 12 wherein the ratio of the metal component to the silicic acid component $SiO_2$ of the metal silicate is represented by the formula:

$$RO_{k/2} \cdot qSiO_2$$

wherein

R is Mg, Ca, Ba, Zn, Al, Fe, Pb, or Cr, $k$ is the valency of the metal R and $q$ is a number from 0.1 to 2.

21. The self-curable composition of claim 19 wherein the inorganic anchoring agent (a) is iron (III) oxide and the weight ratio of (a) to (b) is within the range from 1:0.3 to 1:3.

22. The self-curable composition of claim 21 wherein the weight ratio of (a) to (b) is from 1:05 to 1:2

* * * * *

UNITED STATES PATENT AND TRADEMARK OFFICE
CERTIFICATE OF CORRECTION

PATENT NO. : 4,018,616
DATED : April 19, 1977
INVENTOR(S) : YUJIRO SUGAHARA et al.

It is certified that error appears in the above-identified patent and that said Letters Patent are hereby corrected as shown below:

Claim 8, line 13, delete "generation", insert -- agitation --

Claim 11, line 26, delete "100 ml)", insert -- (mg/100 ml) --

Signed and Sealed this twenty-sixth Day of July 1977

[SEAL]

Attest:

RUTH C. MASON
Attesting Officer

C. MARSHALL DANN
Commissioner of Patents and Trademarks